(12) United States Patent
Belverge et al.

(10) Patent No.: US 10,941,912 B2
(45) Date of Patent: Mar. 9, 2021

(54) FLAMES/SMOKE SIMULATION

(71) Applicant: FOSHAN TONGHUI ELECTRONIC FIREPLACE LTD., Foshan (CN)

(72) Inventors: Antoine Andre Jacques Belverge, Foshan (CN); Jean-Luc Starczan, Foshan (CN)

(73) Assignee: FOSHAN TONGHUI ELECTRONIC FIREPLACE LTD., Foshan (CN)

( * ) Notice: Subject to any disclaimer, the term of this patent is extended or adjusted under 35 U.S.C. 154(b) by 319 days.

(21) Appl. No.: 16/042,150

(22) Filed: Jul. 23, 2018

(65) Prior Publication Data
US 2019/0353316 A1 Nov. 21, 2019

(30) Foreign Application Priority Data
May 16, 2018 (CN) .......................... 201810467038.8

(51) Int. Cl.
*F21S 10/04* (2006.01)
*C06D 3/00* (2006.01)
*F24C 7/00* (2006.01)

(52) U.S. Cl.
CPC ................ *F21S 10/04* (2013.01); *C06D 3/00* (2013.01); *F24C 7/004* (2013.01)

(58) Field of Classification Search
CPC .. F21S 10/04; C06D 3/00; F24C 7/004; F21V 19/00; F21V 23/04; F21V 33/00; F24F 3/14; F24F 3/1603; F24F 2003/1617; F24F 2221/02; F21Y 2113/10
See application file for complete search history.

(56) References Cited

U.S. PATENT DOCUMENTS

| 7,967,690 | B2 | 6/2011 | O'Neill | |
| 8,136,276 | B2 | 3/2012 | O'Neill | |
| 8,413,358 | B2* | 4/2013 | Betz | ........................ F24C 7/004 40/428 |
| 8,574,086 | B2 | 11/2013 | O'Neill | |
| 2011/0062250 | A1* | 3/2011 | Betz | ........................ F24C 7/004 239/102.1 |

FOREIGN PATENT DOCUMENTS

| EP | 2 029 941 B1 | 10/2012 |
| EP | 3 267 112 A2 | 1/2018 |
| EP | 1 787 063 B1 | 4/2018 |
| GB | 2 418 014 A | 3/2006 |
| GB | 2552789 A | 2/2018 |
| RU | 2646265 | * 3/2018 |

* cited by examiner

*Primary Examiner* — Shawntina T Fuqua
(74) *Attorney, Agent, or Firm* — Birch, Stewart, Kolasch & Birch, LLP

(57) ABSTRACT

The present invention relates to a method of simulating flames/smoke using a flames/smoke simulating device or system.

20 Claims, 17 Drawing Sheets

US 10,941,912 B2

FLAMES/SMOKE SIMULATION

BENEFIT CLAIMS

This application claims the benefit of Chinese invention patent application CN201810467038.8, filed 16 May 2018.

TECHNICAL FIELD

The present invention is in the field of household and decorative appliances, specifically, a flames/smoke simulating device or system and the related methods for producing simulated flames/smoke.

BACKGROUND

Following an improvement in standards of living, household living has been transformed with smart living, aesthetically-pleasing and minimalistic approaches. The fireplace is a traditional household article that has been transformed over the years to reflect such changes in modern lifestyle approaches. Specifically, strict adherence to municipal building codes (especially in fire safety considerations) are necessary while meeting the desire and needs of fireplace installation procedures. Furthermore, it is impracticable or impossible to install fireplaces in high-rise buildings since modern building construction methods or fire safety standards do not consider their usage. While modern heating devices may be an alternative to provide warmth (as traditionally accomplished by fireplaces), the visual effects of the flames and/or smoke generated by a fireplace are lacking in modern day, purpose built heating devices. Such flames and/or smoke may provide one with an aesthetically pleasing sight (for example within a living room, or at a place of accommodation), leading to a heightened sensory enjoyment of the built environment.

Currently, devices or systems suitable for flames/smoke simulation are available, for example, in U.S. Pat. Nos. 8,136,276 and 8,413,358. However, these devices do not produce highly-realistic flames/smoke, or are not considered smart (i.e., they cannot be electronically connected to other devices or networks via different wireless protocols such as Bluetooth, Wi-Fi, 2/3/4G, or infra-red (IR) transmissions to operate either interactively and/or autonomously).

In addition, currently available devices or systems suitable for the simulation of fireplace flames/smoke require much space for an adequate installation. This may be due to the requirement of a fan or fans (as positioned in designed manner) in the devices or systems which necessarily require additionally designed voids to enable the intake and forced movement of air to create the desired simulated flames and/or smoke. As such, these devices or systems are generally constructed in a relatively complicated or bulky fashion (for example, as described in EP2029941 and GB2552789), and may lack an ease of maintenance when required. Furthermore, the appearance of the simulated flames and/or smoke may not be readily controllable in degree (for example, as visually stronger or weaker flames and/or form (for instance, in differing color hues or tones), resulting in a simulated flames/smoke effect that may not be as realistic as visually desired.

The device and system in the current application not only simulates highly-realistic flames/smoke, but also serves one or more secondary purposes as the following: a humidifier and/or an air freshener or purifier; in addition, it also presents the characteristic of having the abilities to reduce self-generated noise, and to automatically self-clean its contained tank and fluid channel. Furthermore, the device or system in the present application requires minimal space or void considerations in its installation procedure, therefore reducing the amount of time and effort required for installation.

In view of the above, the presently disclosed technology is put forth.

SUMMARY

In the first aspect, there is provided a flames/smoke simulating device, characterized by having an outer covering, an ultrasound mist generator (6), a mist chamber (1) and a mist chamber fan (3), an air chamber (2) and an air chamber fan (4), a light source (5), and an electronic board; wherein the outer covering consists of a flow outlet (17) and a flow inlet (11); said ultrasound mist generator is positioned within the mist chamber; said mist chamber fan is positioned on the mist chamber; said mist chamber contains an inclined outlet (12); said air chamber fan is positioned on the air chamber; said air chamber contains a straight out outlet (13); said flow inlet, mist chamber and inclined outlet are hydraulically linked; said flow inlet, air chamber and straight out outlet are hydraulically linked; said inclined outlet and straight out outlet concur within the flow outlet; the portion above the flow outlet may be illuminated by the light source; said electronic board is electronically connected to the ultrasound mist generator, mist chamber fan, air chamber fan and light source.

Advantageously, such a flames/smoke simulating device described above is able to provide a highly realistic simulation of flames/smoke. Further advantageously, such simulation does not require the burning of fuels or feedstock to achieve a similar effect, thereby ensuring a clean operating process with pollution free results. Yet further advantageously, such a flames/smoke simulating device provides both a mist chamber and air chamber to enable the creation of highly realistic flames/smoke movements at the interactive concurrence of mist-air and air exiting from the inclined and straight out outlets (these outlets are respectively positioned on the mist and air chambers). Yet even further advantageously, the light source of the flames/smoke simulating device provides a means of illuminating the coupled mist-air and air, effectively causing an observer of the simulated flames/smoke to perceive them as having an elevated temperature. The flames/smoke simulating device also ensures ease of installation within accommodating spaces (for instance within the top surfaces of household furniture like sideboards or tables) since the flow inlet of the device is advantageously positioned on the outer covering to allow air surrounding the device to be drawn into both the mist and air chambers.

In a second aspect, there is provided a method of simulating flames/smoke using the flames/smoke simulating device described in the first aspect, wherein the flames/smoke simulating device consists of a fluid tank (15) and at least a fluid pump; further wherein the ultrasound mist generator (6) is positioned within the fluid channel (10) of the mist chamber (1); wherein the bottom position of the fluid channel consists of a fluid flow opening; said fluid channel (10) and fluid tank (15) are linked by a pipe; yet further wherein the fluid tank (15) is separately linked to the at least one fluid pump and/or a fluid source; the method comprising the following steps: (a) filling the fluid channel of the flames/smoke simulating device with fluid; (b) allowing a portion of the air that enters the flow inlet of the flames/smoke simulating device to push mist out of the mist chamber through the inclined outlet; (c) allowing the remaining portion of the air entering the flow inlet of the flames/smoke simulating device to exit from the straight out outlet; (d) allowing the mist-air exiting the inclined outlet to mix with the exiting air from the straight out outlet to form a resulting lifted mixture, and (e) illuminating the resulting lifted mixture using the light source to form simulated flames/smoke.

Advantageously, the method described in the second aspect allows the creation of highly realistic simulated flames/smoke due to the interactive process of the motion of the exiting mist-air particles from the inclined outlet coupled with the movement of the exiting air from the straight out outlet. Further advantageously, the resulting simulated flames/smoke when illuminated by the light source appear as a highly random, upward moving particulate phase which conveys to an observer the highly realistic visual effect of open, smoky flames.

In a third aspect, there is provided a method of simulating flames/smoke using the flames/smoke simulating device as defined in the second aspect, further wherein the electronic board contains a controller and wireless module, yet further wherein the controller may be connected either be connected to a mobile end terminal via the wireless module, or connected directly with a remote control device; the method comprising the following steps: (a) filling the fluid channel with fluid; (b) allowing a portion of the air that enters the flow inlet of the flames/smoke simulating device to push mist out of the mist chamber through the inclined outlet; (c) allowing the remaining portion of the air entering the flow inlet to exit from the straight out outlet; (d) allowing the mist-air exiting the inclined outlet to mix with the exiting air from the straight out outlet to form a resulting lifted mixture; (e) illuminating the resulting lifted mixture using the light source to form simulated flames/smoke, and (f) selectively controlling the strength and/or color of the formed simulated flames/smoke wirelessly via a mobile end terminal or a remote control device.

Advantageously, the method described in the third aspect allows the creation of highly realistic simulated flames/smoke due to the interactive process of the motion of the exiting mist-air particles from the inclined outlet coupled with the movement of the exiting air from the straight out outlet. Further advantageously, the resulting simulated flames/smoke when illuminated by the light source appear as a highly random, upward moving particulate phase which conveys to an observer the highly realistic visual effect of open, smoky flames. Yet even further advantageously, the strength and/or color of the formed simulated flames/smoke may be wirelessly controlled via the use of a mobile end terminal or a remote control device.

In a fourth aspect, there is provided a flames/smoke simulating system, comprising of a flames/smoke simulating device and at least one extension module, wherein the flames/smoke simulating device is characterized by having an outer covering, an ultrasound mist generator, a mist chamber and a mist chamber fan, an air chamber and an air chamber fan, a light source, and an electronic board; wherein the outer covering consists of a flow outlet (17) and a flow inlet (11); said ultrasound mist generator is positioned within the mist chamber; said mist chamber fan is positioned on the mist chamber; further wherein the mist chamber contains an inclined outlet; said air chamber fan is positioned on the air chamber; further wherein the air chamber contains a straight out outlet; said flow inlet (11), mist chamber and inclined outlet are hydraulically linked; said flow inlet (17), air chamber and straight out outlet are hydraulically linked; said inclined outlet and straight out outlet concur within the flow outlet (17); the portion above the flow outlet can be illuminated by the light source; said electronic board is electronically connected to the ultrasound mist generator, mist chamber fan, air chamber fan and light source, and extension module; the extension module consists of one or more extension devices, wherein each extension device is characterized by having an ultrasound mist generator, a mist chamber and a mist chamber fan, an air chamber and an air chamber fan, and a light source, herein said ultrasound mist generator is positioned within the mist chamber herein said; herein said mist chamber fan is positioned on the herein said mist chamber; further wherein the mist chamber herein said contains an inclined outlet; herein said air chamber fan is positioned on the air chamber herein said; further wherein the mist chamber said herein contains a straight out outlet; herein said flow inlet, herein said mist chamber and herein said inclined outlet are hydraulically linked; herein said flow inlet, herein said air chamber and herein said straight out outlet are hydraulically linked; herein said inclined outlet (12b) and herein said straight out outlet concur within the herein said flow outlet (17); the portion above the herein said flow outlet can be illuminated by the herein said light source.

Advantageously, such a flames/smoke simulating system described above is able to provide a highly realistic simulation of flames and/or smoke. Further advantageously, such simulation does not require the burning of fuels or feedstock to achieve a similar effect, thereby ensuring a clean operating process with pollution free results. Yet further advantageously, such a flames/smoke simulating system provides both mist chamber and air chambers in the flames/smoke simulating system to enable the creation of highly realistic flames/smoke movements at the interactive coupling of mist-air and air exiting from the inclined and straight out outlets (these outlets are respectively positioned on the mist and air chambers). Yet even further advantageously, the light sources of the flames/smoke simulating system provides the means to illuminate the coupled mist-air and air which originate from the mist and air chambers of both the flames/smoke simulating device and extension module as comprised in the flames/smoke simulating system, effectively causing an observer of the simulated flames/smoke to perceive them as having an elevated temperature. The flames/smoke simulating system advantageously allows ease of installation (in addition to a concealed installation) within accommodating spaces (for instance within the top surfaces of household furniture like sideboards or tables) since the flow inlets of the flames/smoke simulating device and the extension module may be advantageously positioned on the outer coverings of the device and extension module to allow air surrounding the system to be drawn into the mist and air chambers of the flames/smoke simulating system. Yet further, the flames/smoke simulating system not only allows for a scale-up of the desired length of simulated flames and/or smoke, but advantageously allows such a scale-up to be achieved with material cost savings (for example, since the flames/smoke simulating system requires only a single, common electronic board to electronically control the workings of the flames/smoke simulating device and extension module as comprised in the flames/smoke simulating system).

In the fifth aspect, there is provided a method of simulating flames/smoke using the flames/smoke simulating system as defined above in the fourth aspect, wherein the flames/smoke simulating device and the one or more extension devices each further consists of a fluid tank further wherein the fluid tank of the flames/smoke simulating device is hydraulically linked to both at least one fluid pump, and the fluid tank or tanks of the one or more extension devices; wherein the ultrasound mist generators of the flames/smoke simulating device and the one or more extension devices is positioned within each of the fluid channels of the corresponding mist chamber or chambers in the flames/smoke simulating device and the one or more extension devices; further wherein the bottom position of each of the fluid channels consists of a fluid outlet; each of the said fluid channels (and each corresponding fluid tank are linked by pipelines; yet further wherein the fluid tank of the flames/smoke simulating device and a fluid source are each linked; the method comprising the following steps:

(a) Filling the fluid channels with fluid;

(b) Allowing a portion of the air that enters the flow inlet of the flames/smoke simulating system to push mist out of the mist chambers through the inclined outlets;

(c) Allowing the remaining portion of the air entering the flow inlet to exit from the straight out outlets;

(d) Allowing mist-air exiting the inclined outlets to correspondingly mix with exiting air from the straight out outlets to form a resulting lifted mixture, and (e) Illuminating the resulting lifted mixture using the light sources to form simulated flames/smoke.

Advantageously, the method described in the fifth aspect allows the creation of highly realistic simulated flames/smoke due to the interactive process of the motion of the exiting mist-air particles from the inclined outlets (both of the flames/smoke simulating device and the extension module) coupled with the movement of the exiting air from the straight out outlets (both of the flames/smoke simulating device and the extension module). The method advantageously creates a desirable longer length of simulated flames/smoke because of the presence of both the flames/smoke simulating device and extension module. Further advantageously, the resulting simulated flames/smoke when illuminated by the light sources appear as a highly random, upward moving particulate phase which conveys to an observer the highly realistic visual effect of open, smoky flames.

In a sixth aspect, there is provided a method of simulating flames/smoke using the flames/smoke simulating system described in the fourth aspect above, wherein the electronic board contains a controller and wireless module, further wherein the controller may either be connected to a mobile end terminal via the wireless module, or directly connected with a remote control device; the method comprising the following steps: (a) filling the fluid channels with fluid; (b) allowing a portion of the air that enters the flow inlet of the flames/smoke simulating system to push mist out of the mist chambers through the inclined outlets; (c) allowing the remaining portion of the air entering the flow inlet to exit from the straight out outlets; (d) allowing mist-air exiting the inclined outlets to correspondingly mix with exiting air from the straight out outlets to form a resulting lifted mixture; (e) illuminating the resulting lifted mixture using the light sources to form simulated flames/smoke, and (f) Selectively controlling the strength and/or color of the formed simulated flames/smoke wirelessly via a mobile end terminal or a remote control device.

Advantageously, the method described in the sixth aspect allows the creation of highly realistic simulated flames/smoke due to the interactive process of the motion of the exiting mist-air particles from the inclined outlets (of the flames/smoke simulating device and the extension module) coupled with the movement of the exiting air from the straight out outlets (of the flames/smoke simulating device and the extension module).

The method advantageously creates a desirable longer length of simulated flames/smoke because of the presence of both the flames/smoke simulating device and extension module. Further advantageously, the resulting simulated flames/smoke when illuminated by the light sources appear as a highly random, upward moving particulate phase which conveys to an observer the highly realistic visual effect of open, smoky flames. Yet, further advantageously, the illumination of the simulated flames/smoke may be selectively controlled by varying the strength and/or color of the formed simulated flames/smoke wirelessly via a mobile end terminal or a remote control device.

Definitions

The following words and terms used herein shall have the meaning indicated:

The term "mist" should be taken to refer to airborne liquid particles or droplets generated by the action of an ultrasonic transducer or the like on a liquid, and more especially to clouds or streams of such particles or droplets.

The term "mist-air" should be taken to refer to a mixture of mist and air.

The use of a slash (/), for instance in "A/B" is to be taken to mean A and B or B and A, e.g. smoke/flames refers to "smoke and flames" or "flames and smoke".

The term "pipe" or "pipeline" as used in the present specification refers to a tube (regardless of length), which is used to convey a fluid or fluids; the terms "pipe" and "pipeline" may be interchangeably used.

The phrase "hydraulically linked" as used in the present specification refers to an interconnected state of a fluid or fluids, including gases, vapors or liquids.

The words "essentially" and "substantially" do not exclude "completely" e.g. a composition which is "substantially free" from Y may be completely free from Y. Where necessary, the word "substantially" may be omitted from the definition of the invention.

Unless specified otherwise, the terms "comprising" and "comprise", and grammatical variants thereof, are intended to represent "open" or "inclusive" language such that they include recited elements but also permit inclusion of additional, unrecited elements.

As used herein, the term "about", typically means +/−10% of the stated value, more typically +/−9% of the stated value, more typically +/−8% of the stated value, more typically +/−7% of the stated value, more typically +/−6% of the stated value, more typically +/−5% of the stated value, more typically +/−4% of the stated value, more typically +/−3% of the stated value, more typically +/−2% of the stated value, more typically +/−1% of the stated value, and even more typically +/−0.5% of the stated value.

The term "slightly", in the context of any value described in the specification means typically +/−10% of the stated value, more typically +/−9% of the stated value, more typically +/−8% of the stated value, more typically +/−7% of the stated value, more typically +/−6% of the stated value, more typically +/−5% of the stated value, more typically +/−4% of the stated value, more typically +/−3% of the stated value, more typically, +/−2% of the stated value, more typically +/−1% of the stated value, and even more typically +/−0.5% of the stated value.

The word "similar" is to be inferred as "comparable with" with the intention to neglect any non-major and/or minor features present.

Throughout this disclosure, certain embodiments may be disclosed in a range format. It should be understood that the description in range format is merely for convenience and brevity and should not be construed as an inflexible limitation on the scope of the disclosed ranges.

Accordingly, the description of a range should be considered to have specifically disclosed all the possible sub-ranges as well as individual numerical values within that range. For example, the description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

DISCLOSURE OF OPTIONAL EMBODIMENTS

Exemplary, non-limiting embodiments according to the first to sixth aspects will now be disclosed.

In an embodiment of the first aspect, the longest dimension of the outer covering is about 50 cm. In a further embodiment, the outer covering may be constructed of metal and/or plastic materials.

In an embodiment, the ultrasound mist generator is of a working ultrasound frequency selected from the range of frequencies between about 20 kHz to about 1000 kHz. In a further embodiment, the ultrasound mist generator may be disc-shaped and having a diameter selected from between about 10 mm to about 80 mm. In yet a further embodiment, the ultrasound mist generator may have an atomization quantity selected from between 10 mL/h to 1000 mL/h. In one embodiment, the ultrasound mist generator is of the piezoelectric transducer type.

In an embodiment, the mist chamber (1) and/or air chamber (2) as shown in FIG. 2a, FIG. 2b and FIG. 5 may be constructed of a plastic material, for example, polyethylene (PE), high-density polyethylene (HDPE), polytetrafluoroethylene (PTFE), polyethylene terephthalate (PET or PETE), polypropylene (PP), polycarbonate (PC), poly(methyl methacrylate) (PMMA), polyoxymethylene (POM) and acrylonitrile butadiene styrene (ABS).

In an embodiment, the mist chamber fan (3) and/or the air chamber fan (4) as shown in FIG. 2a and FIG. 2b may be operable from 1 to about 10000 rpm.

In an embodiment, the light source (5) as shown in FIG. 3 may be red-green-blue (RGB) light emitting diodes (LEDs). In another embodiment, the light source may consist of filters to allow either the dispersion or the focusing of light rays to be provided for.

In an embodiment, the electronic board is a printed circuit board (PCB). In yet another embodiment, the electronic board is concealed within the outer covering.

In an embodiment, as shown in FIG. 4, the length of the flow outlet (17) is about the length of the top cover (7). In another embodiment, the length of the flow inlet (11) is about the length of the top cover (7). In another embodiment, the flow inlet may be positioned at the meeting or overlap of the top cover and any of the side plates (both top cover and any of the side plates being part of the outer covering of the flames/smoke simulating device). In yet another embodiment, the ratio of the width of the flow outlet may be about 2 to about 10 times the width of the flow inlet. In a particular embodiment, the width of the flow outlet is about 5 cm to about 10 cm. In another particular embodiment, the width of the flow inlet is about 0.5 cm to about 2.5 cm.

In an embodiment, the flow outlet (17) is present in the central position of the top cover (7), as shown in FIG. 4.

In an embodiment, the flames/smoke simulating device further consists of a fluid tank and at least a fluid pump; the fluid tank may be constructed of a plastic material, for example, polyethylene (PE), high density polyethylene (HDPE), polytetrafluoroethylene (PTFE), polyethylene terephthalate (PET or PETE), polypropylene (PP), polycarbonate (PC), poly(methyl methacrylate) (PMMA), polyoxymethylene (POM) and acrylonitrile butadiene styrene (ABS). In another embodiment, the fluid pump is a diaphragm pump.

In an embodiment, the ultrasound mist generator is positioned within the fluid channel of the mist chamber; further wherein the bottom position of the fluid channel consists of a fluid flow opening; the fluid flow opening may be adapted to a quick-release type pipe connector. The fluid channel and the fluid tank may be linked with a pipe, of which the material of the pipe may be silicone-based, polytetrafluoroethylene (PTFE)-based, polyvinyl chloride (PVC)-based or made of polyolefins. In another embodiment, the fluid tank is separately linked to the at least one fluid pump and/or fluid source; the fluid may be water, or a mixture of water and oils suitable for aromatherapy (for example, lavender, eucalyptus, peppermint, tea tree, jojoba, chamomile, rose, oregano, jasmine, copaiba, bergamot, neroli, lemon balm, pomegranate, frankincense oils).

In an embodiment, the flames/smoke simulating device contains a fluid channel and tank; the fluid channel and fluid tank each contains a fluid level sensor; the fluid sensor may be of one of the types of level sensing technologies: level gauges, flotation devices, displacers, bubblers, differential pressure transmitting devices, load cells, capacitance transmittance devices, ultrasonic level transmitting devices and laser level transmitters.

In an embodiment, the flames/smoke simulating device contains a mist chamber, of which consists of a mist generating chamber and linkage assembly; the linkage assembly consists of a baseplate and linkage member; the baseplate or linkage member may be fabricated using metal, metal alloys or plastic. In another embodiment, the linkage member may be connected to the baseplate at one or more positions. In an embodiment, the linkage member is connected to the baseplate at two positions and takes on a "Π" shape. In another specific embodiment, the linkage member is detachable from the mist chamber.

In another embodiment, the electronic board contains a controller and wireless module; the controller may be connected to a mobile end terminal via the wireless module, or connected directly with a remote control device; the mobile end terminal may be a mobile computing device (e.g. mobile phone or a tablet computer) installed with the necessary application software to control one or more of the target components (e.g. the light source, the mist chamber and/or air chamber fans) of the flames/smoke simulating device; the remote control device may use infra-red (IR) rays to control one or more of the as-mentioned target components; the mobile computing device may use wireless technologies like Wi-Fi (2.4 GHz, 3.6 GHz or 5.8 GHz) or Bluetooth (2.4 GHz) to control one or more of the as-mentioned target components.

In an embodiment, the inclined outlet of the mist chamber may be inclined at an angle between 30°-70° with reference to the horizon. In another embodiment, the angle of inclination effectively allows the inclined outlet to lean towards the side of the flames/smoke simulating device where the air chamber is positioned.

In an embodiment of the second aspect, the step of filling the fluid channel is carried out through the discharge of fluid from a filled fluid tank; the fluid tank is initially filled via the pipe which links it to the fluid pump and/or fluid source. In one embodiment, the fluid is water. In another embodiment, the fluid source is tap water.

In an embodiment, step (b) of the second aspect is carried out with the flow inlet being positioned at the meeting or overlap of the top cover and any of the side plates (both top cover and any of the side plates being part of the outer covering of the flames/smoke simulating device).

In another embodiment, steps (b) and (d) of the second aspect are carried out when the inclined outlet is inclined at an angle between 30°-70° with reference to the horizon, further in which the angle of inclination effectively allows the inclined outlet to lean towards the side of the flames/smoke simulating device where the air chamber is positioned.

In an embodiment, step (c) of the second aspect is carried out with the flow inlet being positioned at the meeting or overlap of the top cover and any of the side plates (both top cover and any of the side plates being part of the outer covering of the flames/smoke simulating device).

In an embodiment, step (e) is carried out with the light source being red-green-blue (RGB) light emitting diodes (LEDs). In another embodiment, the RGB LED light source may consist of modifiers to allow either the dispersion or the focusing of light rays to be provided for.

In an embodiment of the third aspect, the step of filling the fluid channel is carried out through the discharge of fluid from a filled fluid tank; the fluid tank is initially filled via the pipe which links it to the fluid pump and/or fluid source. In another embodiment, the fluid is water. In yet another embodiment, the fluid source is tap water.

In an embodiment, step (b) of the third aspect is carried out with the flow inlet being positioned at the meeting or overlap of the top cover and any of the side plates (both top cover and any of the side plates being part of the outer covering of the flames/smoke simulating device).

In another embodiment, steps (b) and (d) of the third aspect are carried out when the inclined outlet is inclined at an angle between 30°-70° with reference to the horizon, further in which the angle of inclination effectively allows the inclined outlet to lean towards the side of the flames/smoke simulating device where the air chamber is positioned.

In an embodiment, step (c) of the third aspect is carried out with the flow inlet being positioned at the meeting or overlap of the top cover and any of the side plates (both top cover and any of the side plates being part of the outer covering of the flames/smoke simulating device).

In an embodiment, step (e) of the third aspect is carried out with the light source being red-green-blue (RGB) light emitting diodes (LEDs). In another embodiment, the RGB LED light source may consist of modifiers to allow either the dispersion or the focusing of light rays to be provided for.

In an embodiment, step (f) of the third aspect is carried out via the use of a mobile end terminal; the mobile end terminal is a mobile computing device (e.g. mobile phone or a tablet computer) installed with the necessary application software to control the strength and/or color of the formed simulated flames/smoke; the mobile computing device may use wireless technologies like Wi-Fi (2.4 GHz, 3.6 GHz or 5.8 GHz) or Bluetooth (2.4 GHz) to control to control the strength and/or color of the formed simulated flames/smoke. In another embodiment, step (f) of the third aspect is carried out when the remote control device uses infra-red (IR) rays to control the strength and/or color of the formed simulated flames/smoke.

In an embodiment of the fourth aspect, the longest dimension of the top cover is about 100 cm to 300 cm. In a further embodiment, the outer covering may be constructed of metal and/or plastic materials.

In an embodiment, each of the ultrasound mist generators is of a working ultrasound frequency selected from the range of frequencies between about 20 kHz to about 1000 kHz. In a further embodiment, each of the ultrasound mist generators may be disc-shaped and having a diameter selected from between about 10 mm to about 80 mm. In yet a further embodiment, each of the ultrasound mist generators may have an atomization quantity selected from between 10 mL/h to 1000 mL/h. In one embodiment, each of the ultrasound mist generators is of the piezoelectric transducer type.

In an embodiment, each of the mist chambers and/or each of the air chambers may be constructed of a plastic material, for example, polyethylene (PE), high-density polyethylene (HDPE), polytetrafluoroethylene (PTFE), polyethylene terephthalate (PET or PETE), polypropylene (PP), polycarbonate (PC), poly(methyl methacrylate) (PMMA), polyoxymethylene (POM) and acrylonitrile butadiene styrene (ABS).

In an embodiment, each of the mist chamber fans and/or each of the air chamber fans may be operable from 1 to about 10000 rpm.

In an embodiment, each of the light sources may be red-green-blue (RGB) light emitting diodes (LEDs). In another embodiment, each of the light sources may consist of modifiers to allow either the dispersion or the focusing of light rays to be provided for.

In an embodiment, the electronic board is a printed circuit board (PCB). In yet another embodiment, the electronic board is concealed within the outer covering.

In an embodiment, as shown in FIG. 15, the length of the flow outlet (17) is about the length of the top cover (7). In another embodiment, the length of the flow inlet (11) is about the length of the top cover (7). In another embodiment, the flow inlet may be positioned at the meeting or overlap of the top cover and any of the side plates (both the top cover and any of the side plates being part of the outer covering of the flames/smoke simulating system). In an embodiment, the flow outlet is present in the central position of the top cover. In yet another embodiment, the ratio of the width of the flow outlet may be about 2 to about 10 times the width of the flow inlet. In a particular embodiment, the width of the flow outlet is about 5 cm to about 10 cm. In another particular embodiment, the width of the flow inlet is about 0.5 cm to about 2.5 cm.

In an embodiment, the flames/smoke simulating device and the extension module each further consists of a fluid tank; overall, the flames/smoke simulating system further consists of at least a fluid pump; each of the fluid tanks may be constructed of a plastic material, for example, polyethylene (PE), high density polyethylene (HDPE), polytetrafluoroethylene (PTFE), polyethylene terephthalate (PET or PETE), polypropylene (PP), polycarbonate (PC), poly(methyl methacrylate) (PMMA), polyoxymethylene (POM) and acrylonitrile butadiene styrene (ABS). In another embodiment, the fluid pump is a diaphragm pump.

In an embodiment, each of the ultrasound mist generators is positioned respectively within each of the fluid channels of the mist chambers; further wherein each of the bottom positions of each of the fluid channels consists of a fluid flow opening; each of the fluid flow openings may be adapted to a quick-release type pipe connector. Each of the fluid channels and each of the fluid tanks may be linked with pipelines, of which the material of the pipelines may be silicone-based, polytetrafluoroethylene (PTFE)-based, polyvinyl chloride (PVC)-based or made of polyolefins. In another embodiment, each of the fluid tanks may in turn be linked to the at least one fluid pump and/or fluid source (for example, as shown in FIG. 12 and FIG. 16); the fluid may be water, or a mixture of water and oils suitable for aromatherapy (for example, lavender, eucalyptus, peppermint, tea tree, jojoba, chamomile, rose, oregano, jasmine, copaiba, bergamot, neroli, lemon balm, pomegranate, frankincense oils).

In an embodiment, the flames/smoke simulating device and extension module each contains a fluid channel and fluid tank; each of the fluid channels contains a fluid level sensor while the fluid tank of the extension module contains a fluid level sensor as well. The fluid sensor may be of one of the types of level sensing technologies: level gauges, flotation devices, displacers, bubblers, differential pressure transmitting devices, load cells, capacitance transmittance devices, ultrasonic level transmitting devices and laser level transmitters.

In an embodiment, the flames/smoke simulating device and the extension module each contains a mist chamber; the mist chambers each consists of a mist generating chamber and linkage assembly; the linkage assembly consists of a baseplate and linkage member; the baseplate or linkage member may be fabricated using metal, metal alloys or plastic. In another embodiment, each of the linkage members may be connected to the corresponding baseplate at one or more positions. In a specific embodiment, each of the linkage members is connected to the corresponding baseplate at two positions and takes on a "Π" shape. In another specific embodiment, each of the linkage members is detachable from each of the corresponding mist chamber.

In another embodiment, the electronic board contains a controller and wireless module; the controller may be connected to a mobile end terminal via the wireless module, or connected directly to a remote control device; the mobile end terminal may be a mobile computing device (e.g. mobile phone or a tablet computer) installed with the necessary application software to control one or more of the target components (e.g. each of the light sources, each of the mist chambers fans and/or each of the air chamber fans); the remote control device may use infra-red (IR) rays to control one or more of the as-mentioned target components; the mobile computing device may use wireless technologies like Wi-Fi (2.4 GHz, 3.6 GHz or 5.8 GHz) or Bluetooth (2.4 GHz) to control one or more of the as-mentioned target components.

In an embodiment, each of the inclined outlets of the mist chambers may be inclined at an angle between 30°-70° with reference to the horizon. In another embodiment, the angle of inclination effectively allows each of the inclined outlets to lean towards each of the side of the flames/smoke simulating device or extension module where each of the air chambers is positioned.

In an embodiment of the fifth aspect, the step of filling each of the fluid channels is carried out through the discharge of fluid from each of the filled fluid tanks; each of the fluid tanks is filled in turn starting with the fluid tank of the flames/smoke simulating device via the pipeline which links it to a fluid pump and fluid source (see FIG. 12 or FIG. 16).

In a specific embodiment, the fluid is water. In another embodiment, the fluid source is tap water.

In an embodiment, step (b) of the fifth aspect is carried out with the flow inlet being positioned at the meeting or overlap of the top cover and the corresponding side plates (the top cover and the corresponding side plates being part of the outer covering of the flames/smoke simulating system).

In another embodiment, steps (b) and (d) of the fifth aspect are carried out when each the inclined outlets is inclined at an angle between 30°-70° with reference to the horizon, further in which the angle of inclination effectively allows each of the inclined outlets to lean towards the side of the flames/smoke simulating device where each of the corresponding air chambers is positioned.

In an embodiment, step (c) of the fifth aspect is carried out with each of the flow inlets being positioned at the meeting or overlap of the top cover and the corresponding side plates (the top cover and the corresponding side plates being part of the outer covering of the flames/smoke simulating device).

In an embodiment, step (e) is carried out with each of the light sources being red-green-blue (RGB) light emitting diodes (LEDs). In another embodiment, each of the RGB LED light source may consist of modifiers to allow either the dispersion or the focusing of light rays to be provided for.

In an embodiment of the sixth aspect, the step of filling each of the fluid channels is carried out through the discharge of fluid from each of the filled fluid tanks; each of the fluid tanks is filled in turn starting with the fluid tank of the flames/smoke simulating device via the pipe which links it to a fluid pump and fluid source. In a specific embodiment, the fluid is water. In another embodiment, the fluid source is tap water.

In an embodiment, step (b) of the fifth aspect is carried out with the flow inlet being positioned at the meeting or overlap of the top cover and the corresponding side plates (the top cover and the corresponding side plates being part of the outer covering of the flames/smoke simulating system).

In another embodiment, steps (b) and (d) of the fifth aspect are carried out when each the inclined outlets is inclined at an angle between 30°-70° with reference to the horizon, further in which the angle of inclination effectively allows each of the inclined outlets to lean towards the side of the flames/smoke simulating device where each of the corresponding air chambers is positioned.

In an embodiment, step (c) of the fifth aspect is carried out with the flow inlet being positioned at the meeting or overlap of the top cover and the corresponding side plates (each of the top covers and the corresponding side plates being part of the outer covering of the flames/smoke simulating system).

In an embodiment, step (e) is carried out with each of the light sources being red-green-blue (RGB) light emitting diodes (LEDs). In another embodiment, each of the RGB LED light source may consist of modifiers to allow either the dispersion or the focusing of light rays to be provided for.

In an embodiment, step (f) of the sixth aspect is carried out via the use of a mobile end terminal; the mobile end terminal is a mobile computing device (e.g. mobile phone or a tablet computer) installed with the necessary application software to control the strength and/or color of the formed simulated flames/smoke; the mobile computing device may use wireless technologies like Wi-Fi (2.4 GHz, 3.6 GHz or 5.8 GHz) or Bluetooth (2.4 GHz) to control to control the strength and/or color of the formed simulated flames/smoke. In another embodiment, step (f) of the third aspect is carried out when the remote control device uses infra-red (IR) rays to control the strength and/or color of the formed simulated flames/smoke.

BRIEF DESCRIPTION OF DRAWINGS

The accompanying drawings illustrate disclosed embodiments and serve to explain the principles of the disclosed embodiments. It is to be understood, however, that the drawings are designed for purposes of illustration only, and not as a definition of the limits of the invention.

FIG. 13b shows the corresponding embodiment of the air chambers (2A, 2B, 2C) and air chamber fans (4A, 4B, 4C) of the flames/smoke simulating system as shown in FIG. 13a.

FIG. 17b shows a picture of an embodiment of the flame/smoke simulating device in operation and generating simulated flames/smoke of less than desired realism when synergistic coupling of the exiting mist and air are not present as per the scenario in FIG. 17a.

EXAMPLES

Figure 1:
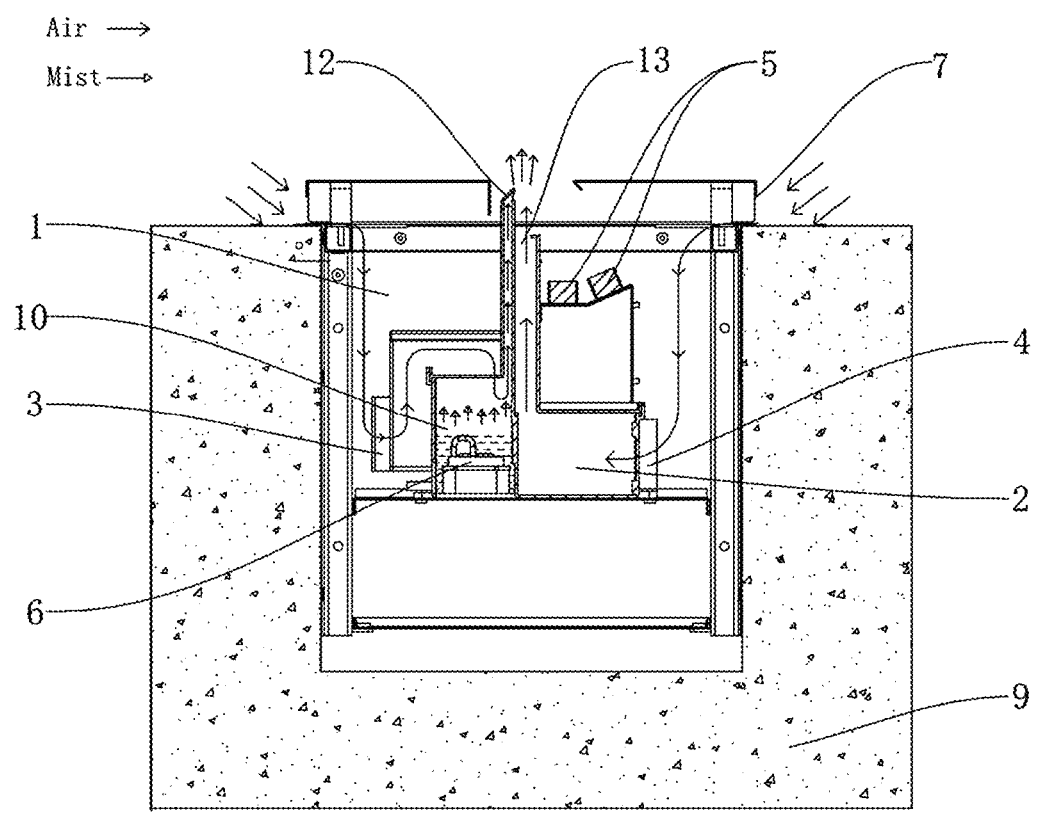
FIG. 1 shows the cross-sectional view of an embodiment of the flames/smoke simulating device.
Figure 2A:
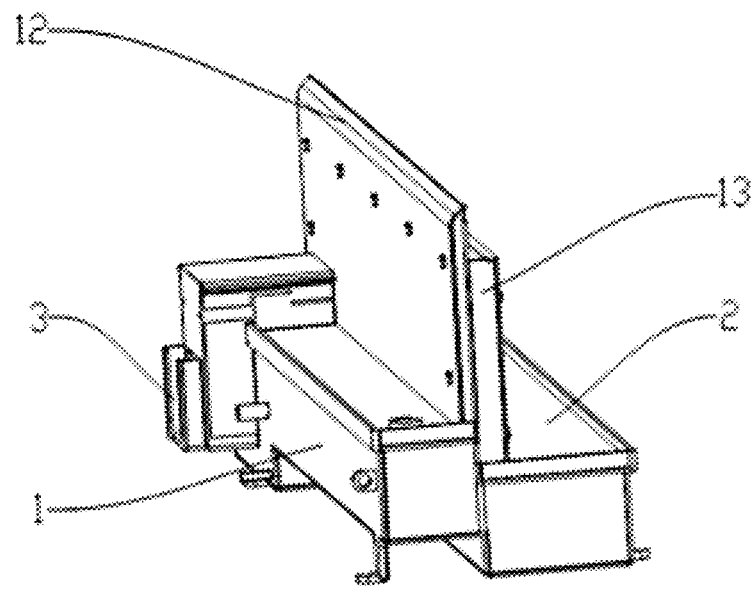
FIG. 2a shows an embodiment of the mist chamber (1), mist chamber fan (3) and air chamber (2) of the flames/smoke simulating device.
Figure 2B:
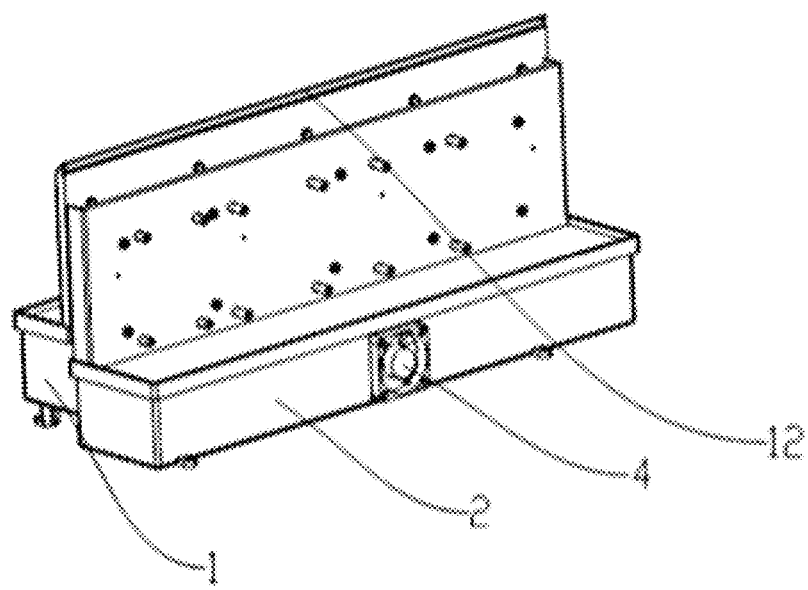
FIG. 2b shows an embodiment of the air chamber (2), air chamber fan (4) and mist chamber (1) of the flames/smoke simulating device.

Non-limiting examples of the invention will be further described in greater detail by reference to specific Examples. These examples should not be construed as in any way limiting the scope of the invention.

Example 1: Flames/Smoke Simulation Using Flames/Smoke Simulating Device

As shown in FIGS. 1-4, the flames/smoke simulating device comprises an outer covering (made up of a top cover (7) and a corresponding quantity of side plates (8)), an ultrasound mist generator (6), a mist chamber (1) and a mist chamber fan (3), an air chamber (2) and an air chamber fan (4), a light source (5), an electronic board; the outer covering consists of a flow outlet (17) and a flow inlet (11); the ultrasound mist generator (6) is positioned within the mist chamber (1); the mist chamber fan (3) is positioned on the mist chamber (1) which contains an inclined outlet (12); the air chamber fan (4) is positioned on the air chamber (2) which contains a straight out outlet (13); the flow inlet (11), mist chamber (1) and inclined outlet (12) are hydraulically linked when the flames/smoke simulating device is in operation. The hydraulic linkage is initiated when air from near the surroundings of the flow inlet (11) is drawn through the flow inlet due to the action of the mist chamber fan. The air as drawn-in meets and interacts with the mist (as generated by the ultrasound mist generator) in the mist chamber; the continuous drawing-in of surrounding air pushes the mist-air mixture out through the inclined outlet.

The flow inlet (11), air chamber (2) and straight out outlet (13) are also hydraulically linked; this hydraulic linkage is initiated when air from near the surroundings of the flow inlet is drawn through the flow inlet due to the action of the air chamber fan. The air as drawn-in then passes through the air chamber and exits from the straight out outlet.

The mist-air phase exiting from the inclined outlet and the air exiting from the straight out outlet then concur at the flow outlet (17) and rises in a plume-like fashion, up to a level above the flow outlet (i.e., the portion above the flow outlet) to be illuminated by the light source (5); the light source may consist of RGB LED lights that can be selected to impart a desired color, for instance, red or orange hues to simulate the flames and smoke rising from a burning coal bed. Other colors hues (from among approximately 16 million color hues) may also be selected to be imparted, so long as the desired color hues falls within the RGB LED light source's color space in regard of the RGB mixing.

The ultrasound mist generator, the mist chamber fan, the air chamber fan and the RGB LED light source are electronically connected to the electronic board present in the flames/smoke simulating device. A variation in speed(s) in the mist chamber fan and/or air chamber fan, or a variation in the mixing of colors of the RGB LED light source may be controlled using the electronic board via the use of tuning knobs. Higher speeds of the mist chamber fan and air chamber fans effectively result in higher reached heights of the simulated flames/smoke when the exiting mist and exiting air concur (see for example, FIG. 17a). This imparts to an observer the illusion of a relatively more intense burning process which accordingly results in the higher reached heights of the simulated flames/smoke.

Figure 17A:
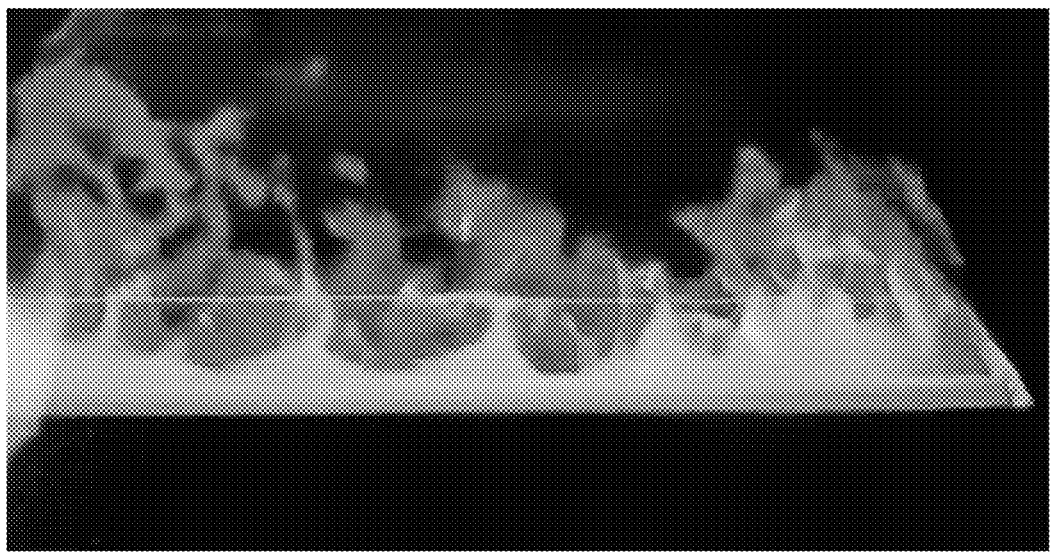
FIG. 17a shows a picture of an embodiment of the flame/smoke simulating device in operation and generating highly-realistic simulated flames/smoke due to the synergistic coupling of exiting mist from its mist chamber and exiting air from its air chamber.

Example 2 (Comparative Example): Variation in Speeds and/or Operation of the Mist Chamber Fan and Air Chamber Fan within the Flames/Smoke Simulating Device In this example, the mist chamber fan (3) and the air chamber fan (4) are both in operation. The intensity of the simulated flames/smoke is directly related to the speeds at which the mist chamber fan and the air chamber fan operate at, and the rate at which the mist generator chamber (6) produces mist: (i) reducing the speeds of both fans produces a simulated flame (at the portion above the flow outlet) with reduced intensity, whilst (ii) increasing the speeds of both fans produces more pronounced simulated flames/smoke (up to the portion above the flow outlet). In both these instances, the movements of the simulated flames/smoke are highly realistic due to the intense coupling of both the exiting mist-air phase and exiting air, as shown in FIG. 17a.

Figure 17B:
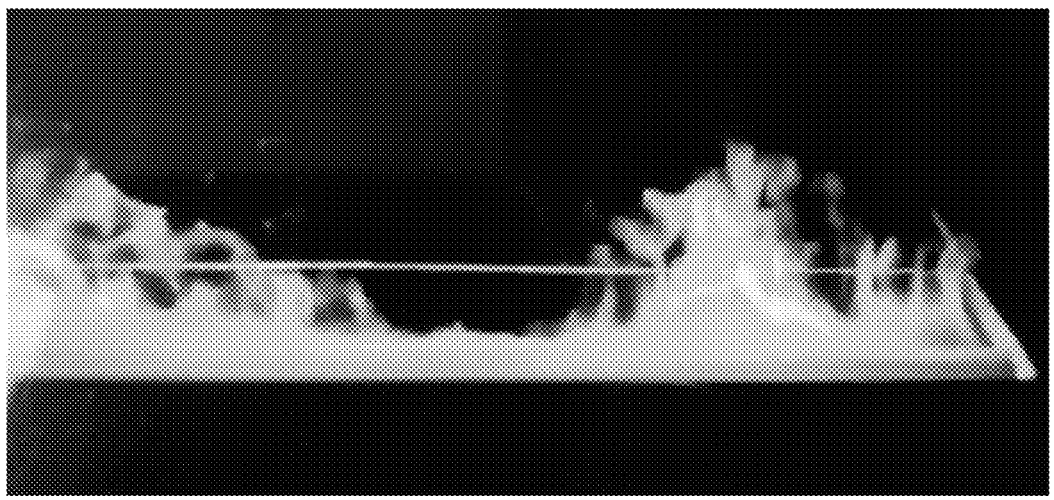

Comparatively, as shown in FIG. 17b, if the mist chamber fan operates whilst the air chamber fan does not operate: (i) any slight reduction in the speed of the mist chamber fan (or the use of relatively lower speeds) and/or lowering the rate at which the ultrasound mist generator generates mist (or the selected use of lower rates of producing mist) results in a collapsed or collapsing curtain of mist at the portion above the flow outlet (thereby producing a mushroom-like plume of flames/smoke); (ii) increasing the speed of the solely operating mist chamber fan and the rate at which the ultrasound mist generator generates mist results in greatly reduced simulated flames/smoke with very limited movement. The conditions as per the comparative example aforementioned are only capable of unrealistic and uncontrollable simulated flames/smoke and their related movements.

Example 3: Variation in Speeds and/or Operation of the Mist Chamber Fan and Air Chamber Fan within the Flames/Smoke Simulating Device The flow inlet (11) is located at the intersecting junction of the top cover (7) and a side plate (8). The flow outlet (17) is positioned at the top of the top cover (7). The flow inlet (11) is slit-shaped, (e.g. as a slit-shaped orifice as formed when the top cover and a side plate just meet or overlap) and located at the intersections of the top cover (7) and front or back side plates. Air entering the flames/smoke simulating device through the flow inlet traverses a tortuous path before exiting from the straight out outlet (13) or inclined outlet (12). When the flames/smoke simulating device is required to be installed within a pedestal (9) (the pedestal may be a customized surface like a table top or a sideboard), because of such positioning of the flow inlet (11) as described (which requires the traversing of a tortuous path in the flame simulating device when the flow inlet is positioned as described), an aesthetically-pleasing installation of the flames/smoke device can be achieved in terms of not requiring additional air headspace which traditionally is necessary for air to be drawn in through a flow inlet.

Figure 3:
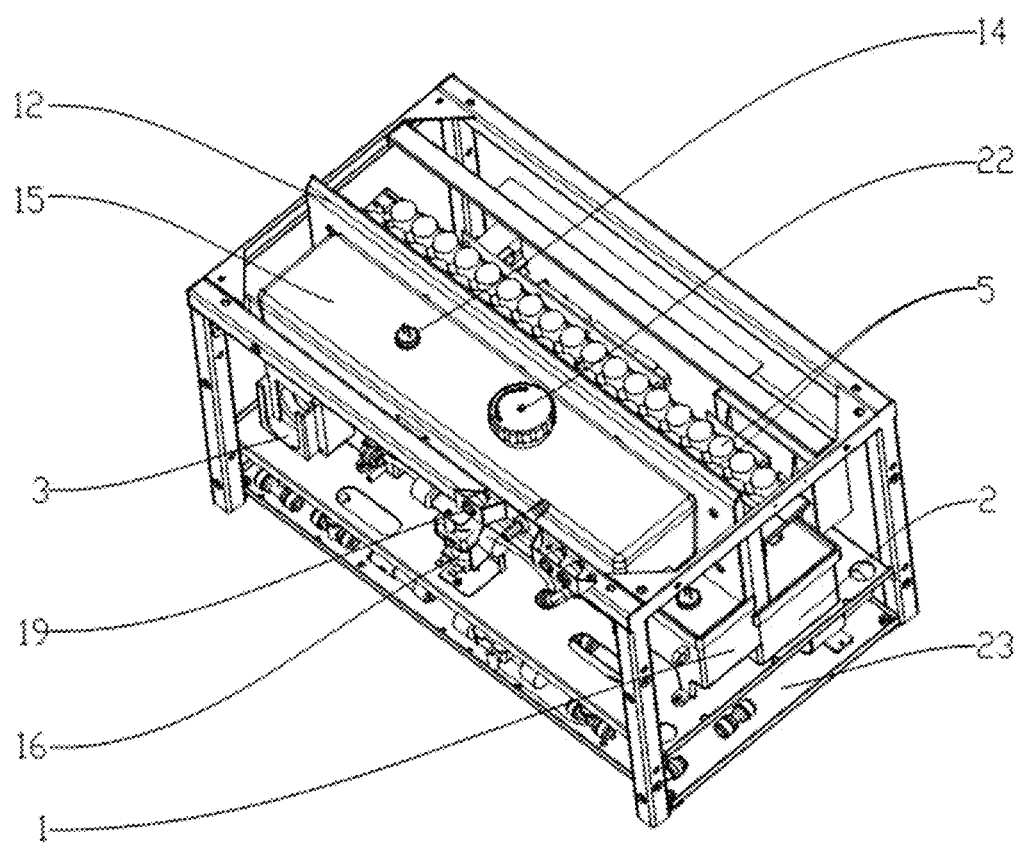
FIG. 3 shows the interior components of an embodiment of the flames/smoke simulating device.
Figure 4:
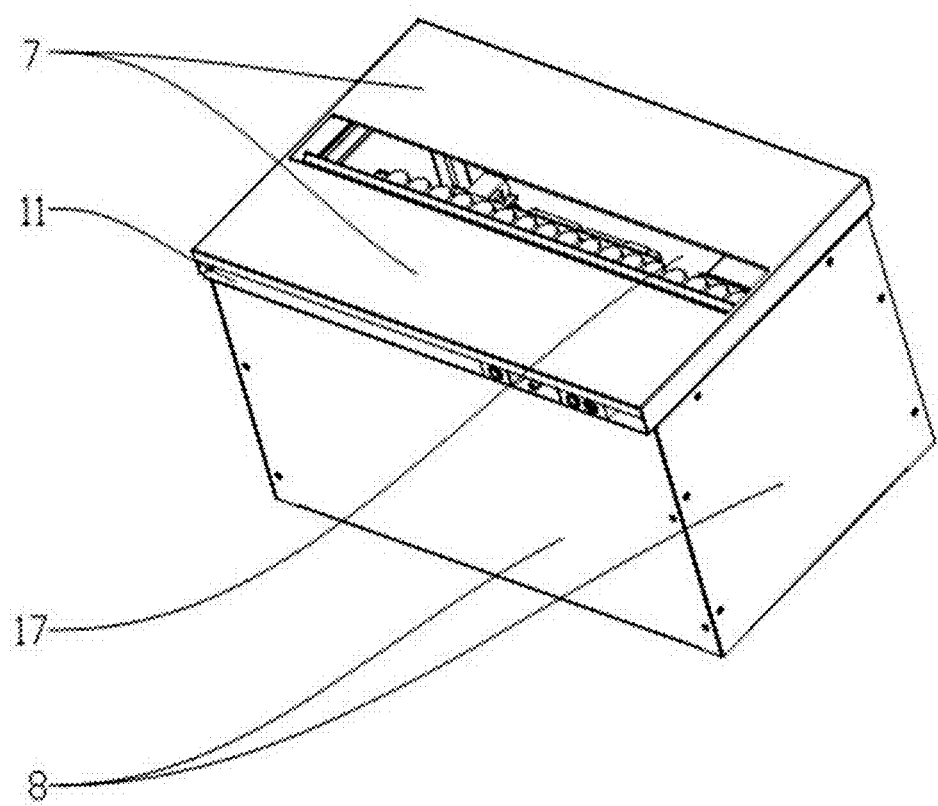
FIG. 4 shows an embodiment of the flames/smoke simulating device with top cover (7) and side plates (8) installed.
Figure 7:
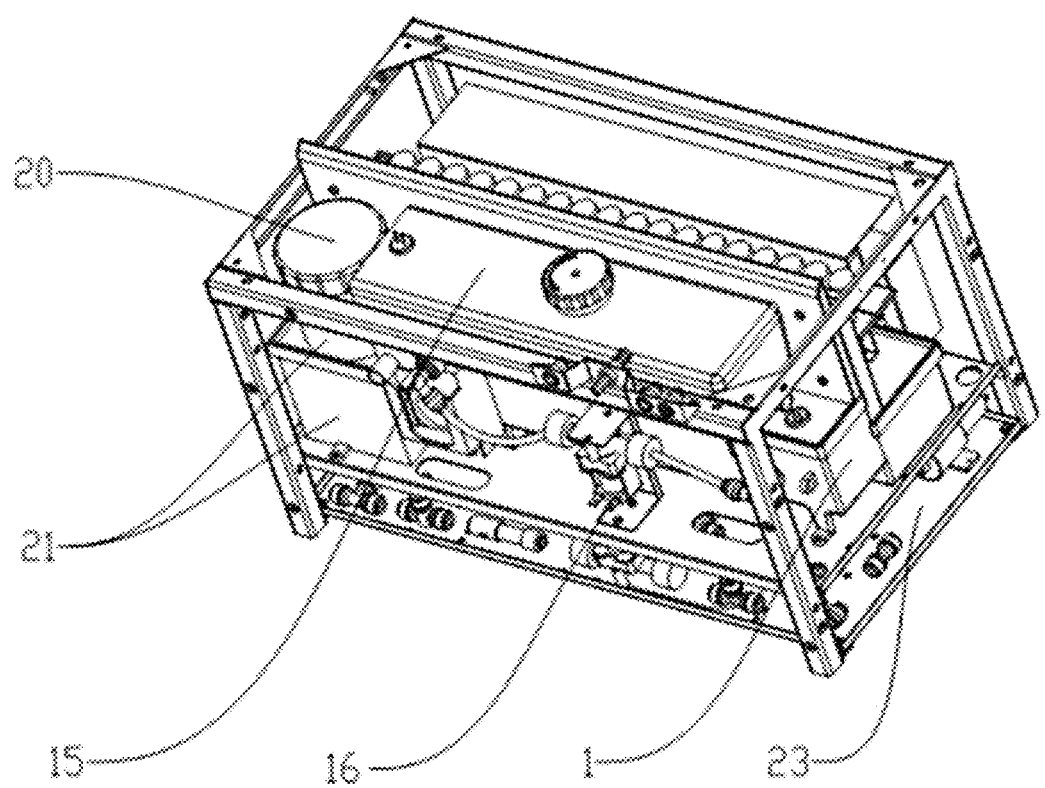
FIG. 7 shows the interior components of another embodiment of the flames/smoke simulating device with a bottom plate (23).
Figure 8:
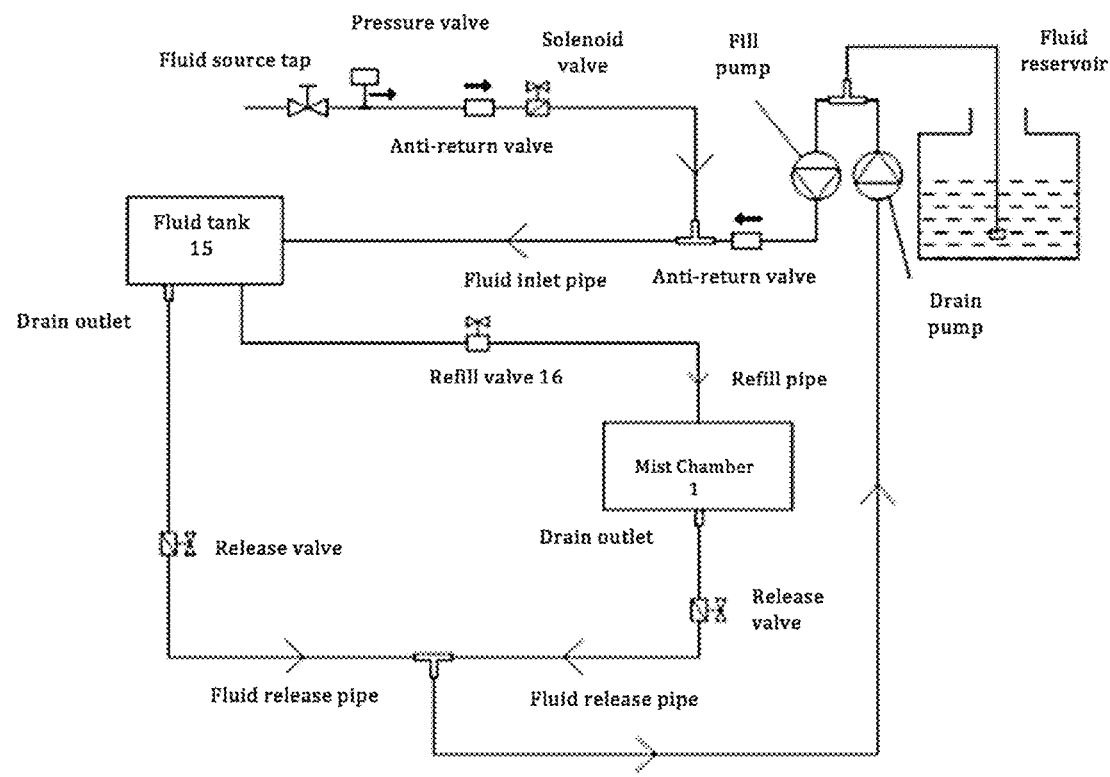
FIG. 8 shows a schematic flow diagram of the workings of an embodiment of the flame/smoke simulating device.

Example 4: Filling/Draining Process of the Flames/Smoke Simulating Device within the Flames/Smoke Simulating Device In this example, the flames/smoke simulating device consists of a fluid tank (15) and two fluid pumps (fill pump and drain pump) as shown in FIG. 8. The ultrasound mist generator (6) is positioned within the fluid channel (10) found within the mist chamber (1); a fluid outlet is positioned close to the bottom of the fluid channel (10); the top of the fluid tank (15) is equipped with a fluid top up point and a fluid tank cap (22) as shown in FIG. 3, thereby facilitating manual draining and/or addition of fluid into the fluid tank if desired. As shown in FIG. 7, the fluid channel (10) and fluid tank (15) (of which exemplarily the fluid tank is positioned at a level higher than the fluid channel) are linked by a pipe; furthermore, as shown in FIG. 8, the fluid tank (15), the fill pump, the drain pump and a fluid reservoir (as the fluid source) are linked. The fluid inlet of the fluid tank (15) is, in order, connected to an anti-return valve and the fill pump, thereby allowing the filling of the fluid tank with fluid from the fluid reservoir when desired. Another means to provide a recharge of fluid into the fluid tank (15) is via a pipeline which in order is connected to a solenoid valve, an anti-return way valve, a pressure valve and a fluid source tap; such a setup along this pipeline allows for control of the fluid flow rate and fluid pressure when supplied with fluid from the fluid source tap. The fluid drain outlet of the fluid tank (15) is connected to a release valve through a fluid release pipe; the fluid drain outlet located close to the bottom of the fluid channel (within the mist chamber (1)) is connected to another release valve through another fluid release pipe; both these fluid release pipes meet and are linked to the drain pump. Suitably selecting/controlling the flow rates and/or fluid pressures allows a flushing of the fluid tank, fluid channel and other related components when desired cleaning or maintenance of the flames/smoke simulating device is to be carried out. In addition, since the flames/smoke simulating device allows a selection from various methods to top up the fluid tank such flexibility suitably allows the easily adaptable use of the flames/smoke simulating device under a wide range of plumbing considerations.

Example 5: Typical Fluid Level Sensing within the Flames/Smoke Simulating Device The fluid channel (10) and fluid tank (15) of the flames/smoke simulating device is each installed with a fluid level sensor (14) (exemplarily shown installed in FIG. 3 upon the fluid tank (15); a refill pipe arises from near the bottom of the fluid channel (of the mist chamber) and as connected to the fluid tank (see FIG. 8) may be provided with a refill valve (16) to control the fluid top up process; the fill pump, the fluid level sensors and refill valve (16) for controlling the fluid top up process are connected and electronically communicable with the electronic board. The refill valve (16) controls the fluid flow in the pipe from the fluid tank to the mist chamber; the fluid level sensor in the fluid channel (within the mist chamber) works in tandem with the refill valve (16) and the level of fluid in the fluid channel (10) to control the level of fluid to a certain desired level that is suitably ideal for the ultrasound mist generator (as positioned within the fluid channel) to operate effectively. On the other hand, the fluid level sensor (14) in the fluid tank (15) is able to detect a low fluid level in the fluid tank and accordingly send a signal to the electronic board to further enable one of the fluid sources (e.g. the fluid source tap or fluid reservoir) to be activated for the refilling of fluid to be carried out. It is not necessary to activate by hand the fill pump in the processes of refilling fluid, since a software application on a mobile terminal or a remote control may be used to do so. In addition, a smart programmable sequence may be implemented through the electronic board to automatically sense levels of fluid in the fluid channel and fluid tank, control the refilling/release of fluid, the cleaning of the fluid channel and/or fluid tank and other relevant components (e.g. pipes) of the flames/smoke simulating device.

Figure 5:
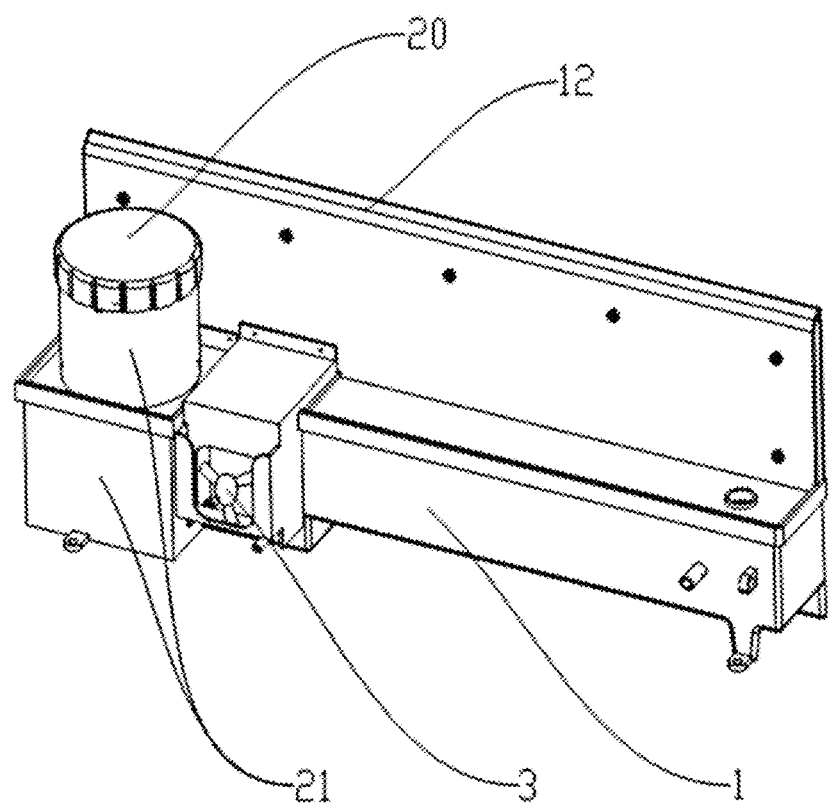
FIG. 5 shows an embodiment of the mist chamber (1), mist generator chamber (21), mist chamber cap (20), inclined outlet (12) and mist chamber fan (3) of the flames/smoke simulating device.
Figure 6:
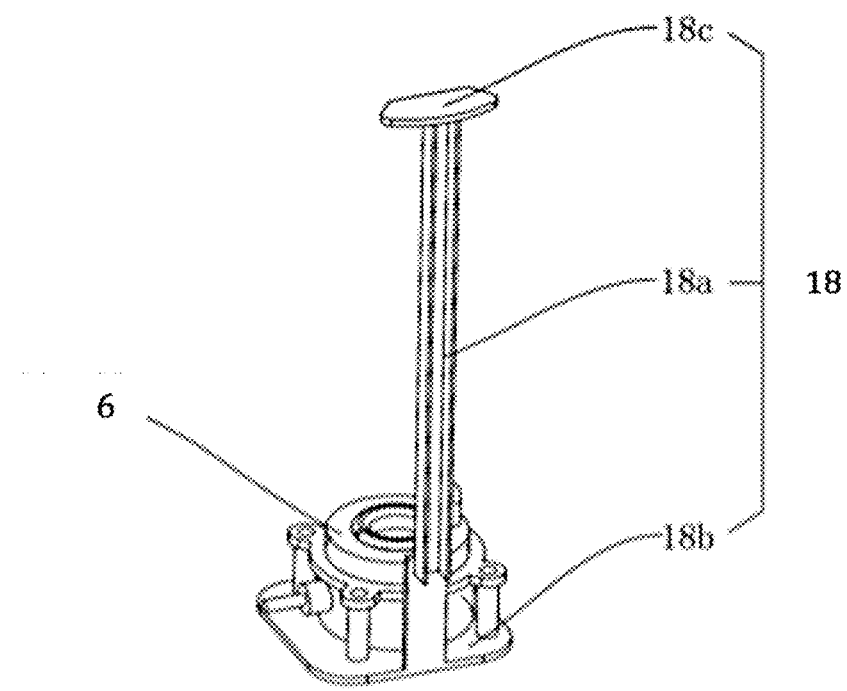
FIG. 6 shows an embodiment of the linkage assembly (18) (including linkage member (18a), baseplate (18c) and handle (18c)) with an ultrasound mist generator (6) installed on the baseplate.

Example 6: Maintenance/Replacement of the Ultrasound Mist Generator within the Flames/Smoke Simulating Device As shown in FIGS. 5 and 6, the mist chamber comprises of a mist generator chamber (21) and a linkage assembly (18); the linkage assembly (18) includes a baseplate (18*b*) and linkage member (18*a*). The ultrasound mist generator (6) is installed upon the baseplate (18*b*); the linkage assembly is reversibly detachable/installable from the mist generator chamber (21) below the mist generator chamber cap (20). A grove is present throughout the length of the linkage member (18*a*) to accommodate water-proofed electrical wiring and to allow it to be movable in a vertical sliding fashion within the mist generator chamber; the linkage member (18*a*) is attached to the baseplate (18*b*) rigidly at one end; a handle (18*c*) may be present at the other end. The handle may be positioned near the opening of the mist generator chamber. The mist generator cap (20) may be used to rigidly suppress the handle of the linkage member; since the baseplate (18*b*) is in contact with the bottom of the mist generator chamber, this therefore enables the linkage assembly and the ultrasound mist generator (6) also to be securely held in position. When the ultrasound mist generator (6) is faulty or not operating normally, the mist generator chamber cap (20) may be removed and the linkage member (18*b*) may be moved (via use of the handle) in an upward sliding fashion to remove the linkage assembly (18) and the ultrasound mist generator (6); the ultrasound mist generator can thereafter be serviced or replaced, and the linkage assembly together with the serviced or a replaced ultrasound mist generator reinstalled into the mist generator chamber.

Example 7: Dry Contact Switches within the Flames/Smoke Simulating Device

Exemplarily, the flames/smoke simulating device includes a voltage supply; the voltage supply may consist of a dry contact and a 24V dc power supply socket. A fluid refill switch, a fluid release switch, a main power switch and other switches present may be configured as dry contacts to allow fluid refilling, fluid release and to turn the main power supply via a power supply switch (19) to the flames/smoke simulating device on or off.

Example 8: Filter Layers of Air Chamber and Mist Chamber Fans of the Flames/Smoke Simulating Device Exemplarily, the inlets to the air chamber fan (4) and mist chamber fan (3) may each be fitted with a filter layer. The filter layer can be fabricated from carbon fibers or any suitable filter material (e.g. fabric or polymeric material) and can fulfill the purpose of preventing dust and dirt from directly entering the fans. In addition, each of the filter layers also serves to physically damp noise as generated by either fan, thus allowing a quiet operation of the flames/smoke simulating device.

Example 9: Wireless Control of the Flames/Smoke Simulating Device

The electronic board is equipped with a controller and a wireless communication module. The controller is able to communicate through the wireless module with a mobile terminal end, or directly with a remote control device. The wireless communication module may be Wi-Fi technology, Bluetooth technology or cellular data. The controller can be used to synergistically control the various electrical and/or electronic components of the flame simulating device via the wireless module, or through the use of the remote control device.

Example 10: Uplift of Exiting Mist-Air Mix from Mist Chamber by Exiting Air from Air Chamber within the Flames/Smoke Simulating Device Exemplarily, the inclined outlet of the mist chamber may be inclined at an angle, for example, between 30°-70° with reference to the horizon. The exiting mist-air mix (as generated within the mist chamber (1)) requires to be lifted; the required lifting force is provided by the air that exits from the straight out outlet (13) of the air chamber, thereby effecting a majorly vertical movement of the mist-air mix. In an example, the inclined outlet is inclined at an angle of 45° (with reference to the horizon) and leans towards the side of the air chamber; the exiting air-mist mix encounters the air from the straight out outlet (13) and is lifted in an efficient manner to create a highly-realistic simulation of flames/smoke. The simulated flames/smoke may thereafter be illuminated by the light source (5).

Example 11: Illumination of the Simulated Flames/Smoke within the Flames/Smoke Simulating Device Exemplarily, the light source (5) includes an orange colored light bank and a RGB (Red-Green-Blue) light bank. The orange light bank may consist of multiple lights positioned at a level below the flow outlet (17). The RGB light bank may consist of multiple RGB lights, each having a selectable red, green or blue channel. The RGB lights are also positioned at a level below the flow outlet (17). In addition, the RGB light bank may be suitably installed at a selectable angle of inclination between 30°-70° (with reference to the horizon, and further in which the lights of the RGB light bank point towards the formed simulated flames/smoke), depending on the distance between the flow outlet (17) and the position of the RGB light bank. The light rays from the lights of the light banks may be of a dispersed form (e.g. through the use of light modifiers like diffusers) to allow the adequate illumination of the simulated flames/smoke to create highly realistic simulated flames/smoke.

Example 12: Illumination of the Simulated Flames/Smoke Using Different Color(s) within the Flames/Smoke Simulating Device Exemplarily, the colors which can be selected to illuminate the simulated flames/smoke of Example 11 may be achieved by the mixing of the colors that may be formed and mixed by any combination of red, green, blue and/or orange. The colors of the simulated flames/smoke may be controlled and selected using a mobile end terminal or a remote control device. A relevant application software may be provided at the mobile end terminal or remote control device for this purpose. The application software may allow one to select a suitable red, green or blue channel by providing suitable selection buttons. Exemplarily, the mobile end terminal may be a mobile phone, a tablet device, or other suitable mobile devices; for instance on a mobile phone, the software application may provide a user interface which presents multiple red, green and blue simulated buttons for selection.

Example 13: Control of the Intensity of the Simulated Flames/Smoke within the Flames/Smoke Simulating Device Exemplarily, a relevant application software may be provided at the mobile end terminal or remote control device to allow the control of the desired intensity of the simulated flames/smoke. The mobile end terminal may be a mobile phone, a tablet device, or other suitable mobile devices. The application software may be in the form of a user interface that presents the options to control the speeds of the mist chamber fan (3) and/or air chamber fan (4), together with the possibility of controlling the rate at which mist is generated by the ultrasound mist generator (6), the overall desired intensity of the simulated flames/smoke may then be communicated to and effected by the controller on the electronic board.

Example 14: Control of the Colors and Intensity of the Simulated Flames/Smoke within the Flames/Smoke Simulating Device Exemplarily, both the color and the intensity of the simulated flames/smoke may be controlled. A relevant application software may be provided at the mobile end terminal or remote control device to allow the control of the desired color(s) and intensity of the simulated flames/smoke. The mobile end terminal may be a mobile phone, a tablet device, or other suitable mobile devices.

Example 15: Humidification/Aromatherapy Capability of the Flames/Smoke Simulating Device Exemplarily, the mist-air mix as generated by an operating flame simulating device creates an environment with increased relative humidity; such a process serves to humidify the environment and may be desirable to maintain a comfortable level of humidity suitable for dry climates. Further exemplarily, an air freshener or fragrance essence may be added to the fluid channel (10) of the flames/smoke simulating device to consequently create a pleasant aroma around the surroundings external to the device.

Example 16: Flames/Smoke Simulation Using Flames/Smoke Simulating System

In this example, the flames/smoke simulating system comprises a flames/smoke simulating device and an extension module.

Figure 11:
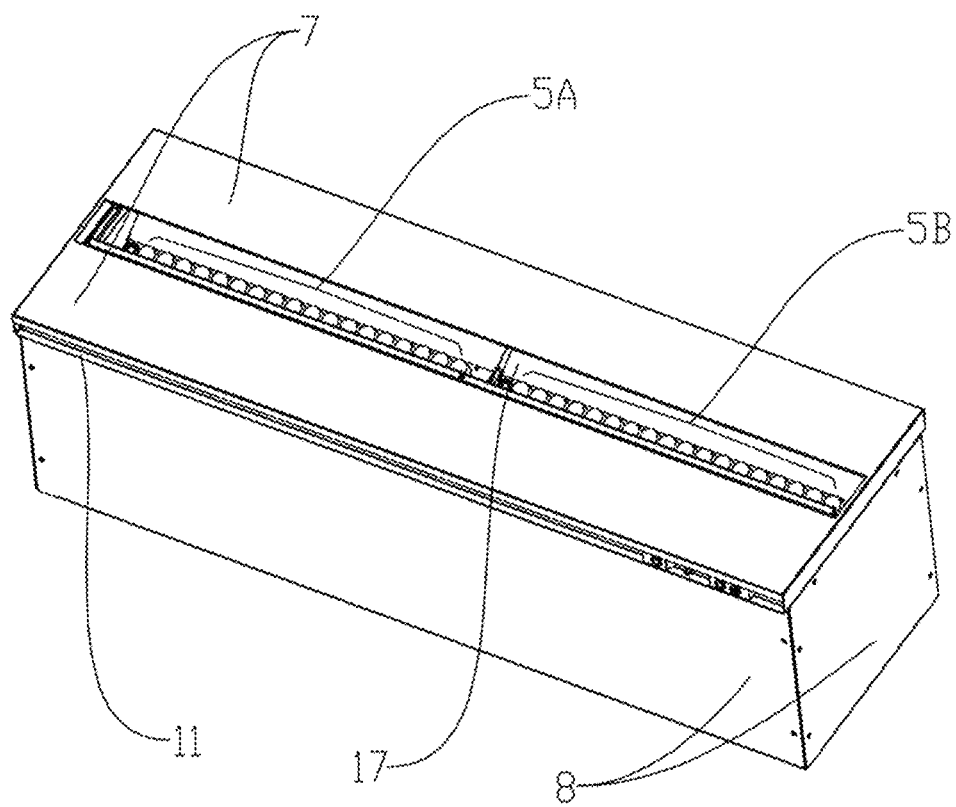
FIG. 11 shows an embodiment of the flames/smoke simulating system (single extension device) with top cover (7) and side plates (8) installed.

As shown in FIG. 11, the flames/smoke simulating system (with a single extension device) comprises an outer covering (made up of a top cover (7) and a corresponding quantity of side plates (8)), two ultrasound mist generators (6A, 6B), two mist chambers (1A, 1B) each with corresponding mist chamber fan (3A, 3B), two air chambers (2A, 2B) each with a corresponding an air chamber fan (4A, 4B), two light sources (5A, 5B), an electronic board; the outer covering consists of a flow outlet (17) and a flow inlet (11); each ultrasound mist generator (6A, 6B) is positioned within each of its mist generator chamber chambers (21A, 21B) in the corresponding mist chambers (1A, 1B); each of the mist chamber fans (3A, 3B) is positioned on the corresponding mist chamber (1A, 1B) of which each contains an inclined outlet (12A, 12B); each air chamber fan (4A, 4B) is positioned on each of the corresponding air chambers (2A, 2B) of which each contains a straight out outlet (13A, 13B) (shown in FIG. 9b); the flow inlet (11), mist chambers (1A, 1B) and inclined outlets (12A, 12B) are hydraulically linked when the flames/smoke simulating system is in operation. The hydraulic linkage is initiated when air from near the surroundings of the flow inlet (11) is drawn through the flow inlet due to the action of each of the mist chamber fans (3A, 3B). The air as drawn-in meets and interacts with mist (as generated by both the ultrasound mist generators (6A, 6B) in each of the mist chambers (1A, 1B); the continuous drawing-in of surrounding air pushes the mist-air mixtures within the mist chambers out through the inclined outlets (12A, 12B).

The flow inlet (11), air chambers (2A, 2B) and straight out outlets (13A, 13B) are also hydraulically linked; this hydraulic linkage is initiated when air from near the surroundings of the flow inlet is drawn through the flow inlet due to the action of the air chamber fans (4A, 4B). The air as drawn-in then passes through the air chambers (2A, 2B) and exits from the straight out outlets (13A, 13B).

The mist-air phase exiting from the inclined outlet (12A) and air exiting from the straight out outlet (13A) then concur at the flow outlet (11) and rises in a plume-like fashion, up to a level above the flow outlet (11) to be illuminated by the light source (5A). Similarly, the mist-air phase exiting from the inclined outlet (12B) and air exiting from the straight out outlet (13B) concur at the flow outlet (11) and rises in a plume-like fashion, up to a level above the flow outlet (11) (i.e., the portion above the flow outlet) to be illuminated by the light source (5B).

The light source (5A, 5B) may consist of RGB LED lights that can be selected to impart a desired color, for instance, red or orange hues to simulate flames and smoke rising from a burning coal bed. Other colors hues (from among approximately 16 million color hues) may also be selected to be imparted, so long as the desired color hues falls within the RGB LED light source's color space in regard of the RGB mixing.

The ultrasound mist generators (6A, 6B), the mist chamber fans (3A, 3B), the air chamber fans (4A, 4B) and the RGB LED light sources (5A, 5B) are electronically connected to the electronic board present in the flames/smoke simulating device of the flames/smoke simulating system. A variation in speed(s) in the mist chamber fans (3A, 3B) and/or air chamber fans (4A, 4B), or a variation in the mixing of colors of the RGB LED light sources (5A, 5B) may be controlled using the electronic board via the use of tuning knobs. Higher speeds of the mist chamber fans (3A, 3B) and air chamber fans (4A, 4B) effectively result in higher reached heights of the simulated flames/smoke when the exiting mist and exiting air concur at the flow outlet (11). This imparts to an observer the illusion of a relatively more intense burning process which accordingly results in the higher reached heights of the simulated flames/smoke.

Example 17 (Comparative Example): Variation in Speeds and/or Operation of the Mist Chamber Fans and Air Chamber Fans of the Flames/Smoke Simulating System In this example, for a flames/smoke simulating system with a single extension device, the mist chamber fans (3A, 3B) and the air chamber fans (4A, 4B) are both in operation. The intensity of the simulated flames/smoke is directly related to the speeds at which the mist chamber fans (3A, 3B) and the air chamber fans (4A, 4B) operate at, and the rate at which the mist generator chambers (6A, 6B) produce mist: (i) reducing the speeds of the fans (3A, 3B, 4A, 4B) produces an overall simulated flame (at the portions above the flow outlet) with reduced intensity, whilst (ii) increasing the speeds of all fans (3A, 3B, 4A, 4B) produces more pronounced simulated flames/smoke (at the portions above the flow outlet (11)). In both these instances, the movements of the simulated flames/smoke are highly realistic due to the intense coupling of both the exiting mist-air phase and exiting air from the inclined outlets (12A, 12B) and straight out outlets (13A, 13B).

Comparatively, if the mist chamber fans (3A, 3B) operate whilst the air chamber fans (4A, 4B) do not operate: (i) any slight reduction in the speeds of the mist chamber fans (3A, 3B) (or the use of relatively lower speeds) and/or lowering the rate at which the ultrasound mist generators (6A, 6B) generate mist (or the selected use of lower rates of producing mist) results in a collapsed or collapsing curtain of mist at the portions above the flow outlet (thereby producing mushroom-like plumes of flames/smoke); (ii) increasing the speed of the operating mist chamber fans (3A, 3B) and the rate at which the ultrasound mist generators (6A, 6B) generate mist results in greatly reduced simulated flames/smoke with very limited movement. The conditions as per the comparative example aforementioned are only capable of unrealistic and uncontrollable simulated flames/smoke and their related movements.

Example 18: Installation of a Flames/Smoke Simulating System in a Pedestal

The flow inlet (11) is located at the intersecting junction of the top cover (7) and any side plate (8). The flow outlet (17) is positioned at the top of the top cover (7). The flow inlet (11) is slit-shaped, (e.g. as a slit-shaped orifice as formed when the top cover and a side plate just meet or overlap) and located at the intersections of the top cover (7) and any side plate (8) (e.g. front, back side plates). Air entering the flames/smoke simulating system through the flow inlet (11) traverses a tortuous path before exiting from the straight out outlets (13A, 13B) or inclined outlets (12A, 12B). When the flames/smoke simulating system is required to be installed within a pedestal (9) (the pedestal may be a customized surface like a table top or a sideboard), because of such positioning of the flow inlet (11) as described (which requires the traversing of a tortuous path in the flame simulating device when the flow inlet is positioned as described), an aesthetically-pleasing installation of the flames/smoke system can be achieved in terms of not requiring additional air headspace which traditionally is necessary for air to be drawn in through a flow inlet.

Example 19: Filling/Draining Process of the Flames/Smoke Simulating System

Figure 10:
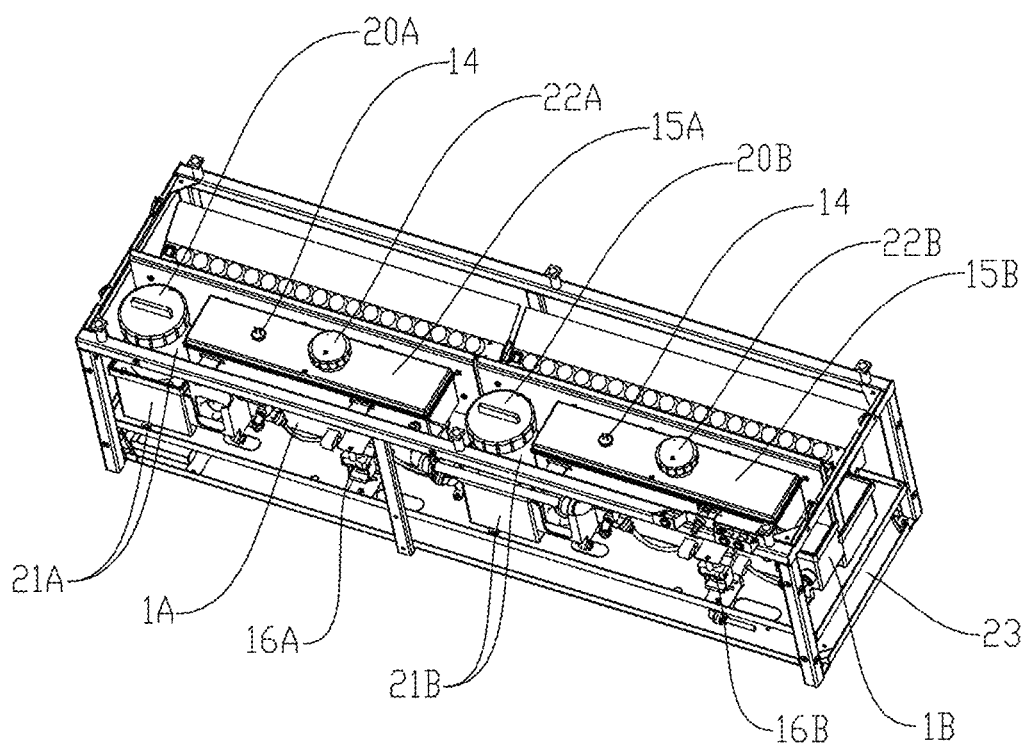
FIG. 10 shows the interior components of an embodiment of the flames/smoke simulating system (single extension device), complete with solenoid (refilling) valves (16A, 16B).
Figure 12:
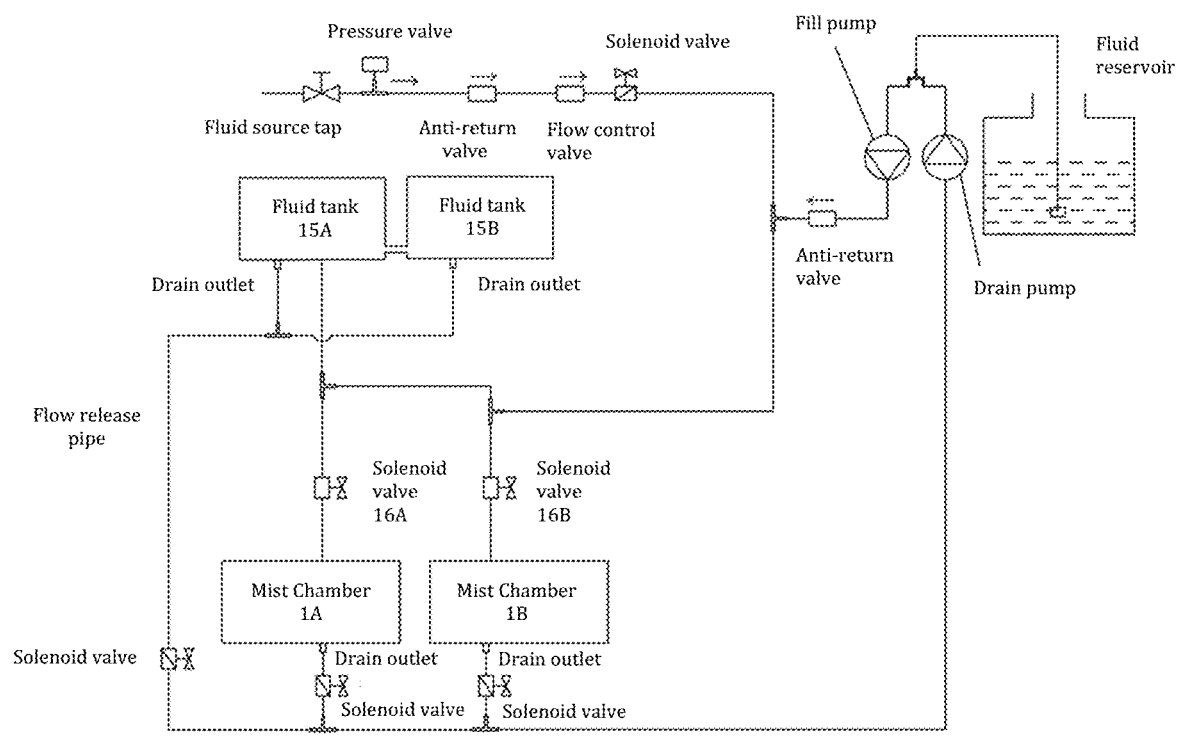
FIG. 12 shows a schematic flow diagram of the workings of an embodiment of the flame/smoke simulating system (single extension device).

In this example, the flames/smoke simulating system consists of two fluid tanks (15A, 15B) and two fluid pumps (fill pump and drain pump) as shown in FIG. 12. The ultrasound mist generators (6A, 6B) are positioned within the fluid channels (10A, 10B) found within the mist chambers (1A, 1B); a fluid outlet is positioned close to each of the bottom of the fluid channels (10A, 10B); the top of the fluid tanks (15A, 15B) is each equipped with a fluid top up point and a fluid tank cap (22A, 22B) as shown in FIG. 10, thereby facilitating manual draining and/or addition of fluid into the fluid tanks (15A, 15B) if desired. As shown in FIG. 12, the fluid channels (10A, 10B) and fluid tanks (15A, 15B) (of which exemplarily each fluid tank is positioned at a level higher than its corresponding fluid channel) are linked by a pipeline (for instance, fluid channel (10A) is linked by a pipe to fluid tank (15A); furthermore, the fluid tanks (15A, 15B), the fill pump, the drain pump and a fluid reservoir (as the fluid source) are linked. The fluid inlet of the fluid tank (15A) is, in order, connected to an anti-return valve and the fill pump, thereby initially allowing the partial filling of the fluid tank (15A) with fluid from the fluid reservoir when desired. This fluid tank (15A) serves as a buffer volume for filling the other fluid tank (15B) first, i.e., any overflow fluid from the other as-filled fluid tank (15B) will subsequently fill the earlier fluid tank (15A) up to a level as determined by a fluid level sensor.

Another fluid means to provide a recharge of fluid into the fluid tanks (15A, 15B) is via a pipeline which in order is connected to a solenoid valve, a flow control valve, an anti-return valve, a pressure valve and a fluid source tap; this allows for control of the fluid flow rate and fluid pressure when supplied with fluid from the fluid source tap. The fluid drain outlets of the fluid tanks (15A, 15B) are connected to a release valve (solenoid valve) through a fluid release pipe; the fluid drain outlets located close to the bottom of the fluid channels (10A, 10B) (within the corresponding mist chambers (1A, 1B)) are each connected to a release valve (solenoid valve) and are linked to the drain pump.

Suitably selecting/controlling the flow rates and/or fluid pressures allows a flushing of the fluid tanks (15A, 15B), fluid channels (10A, 10B) and other related components when desired cleaning or maintenance of the flames/smoke simulating system is to be carried out. In addition, since the flames/smoke simulating system allows a selection from various methods to top up the fluid tanks (15A, 15B) such flexibility suitably allows the easily adaptable use of the flames/smoke simulating system under a wide range of plumbing considerations.

Example 20: Typical Fluid Level Sensing within the Flames/Smoke Simulating System In this example, the flames/smoke simulating system consists of a flames/smoke simulating device and an extension device. Two fluid tanks (15A, 15B) are present as depicted in FIG. 12. The fluid channels (10A, 10B) and fluid tank (15A) of the flames/smoke simulating system are each installed with a fluid level sensor; a refill pipe is present from near the bottom of each of the fluid channels (10A, 10B) (within each of the mist chambers (1A, 1B)) and as connected to the fluid tanks (15A, 15B) may each be provided with a solenoid valve to control the fluid top up process within each mist chamber (1A, 1B); the fill pump, the fluid level sensors and as-mentioned solenoid valves for controlling the fluid top up process are connected and electronically communicable with the electronic board of the flames/smoke simulating device as present in the flames/smoke simulating system.

A solenoid valve controls the fluid flow in the pipe from the fluid tanks (15A, 15B) to the mist chambers (1A, 1B); the fluid level sensors in the fluid channels (10A, 10B) (within the mist chambers) work in tandem with the solenoid valve and the levels of fluid in the fluid channels (10A, 10B) to control the levels of fluid to a certain desired level that is suitably ideal for the ultrasound mist generators (6A, 6B) (as correspondingly positioned within the fluid channels (10A, 10B) to operate effectively. On the other hand, the fluid level sensor (14) in the fluid tank (15A) as shown in FIG. 10 is able to detect a low fluid level in the fluid tank (15A) and accordingly sends a signal to the electronic board to further enable one of the fluid sources (e.g. the fluid source tap or fluid reservoir) to be activated for the refilling of fluid to be carried out. It is not necessary to activate by hand the fill pump in the processes of refilling fluid, since a software application on a mobile terminal or a remote control may be used to do so. In addition, a smart programmable sequence may be implemented through the electronic board to automatically sense the levels of fluid in the fluid channels (10A, 10B) and fluid tank (15A), control the refilling/release of fluid, the cleaning of the fluid channels (10A, 10B) and/or fluid tank (15A) and other relevant components (e.g. pipelines) of the flames/smoke simulating system.

Figure 13A:
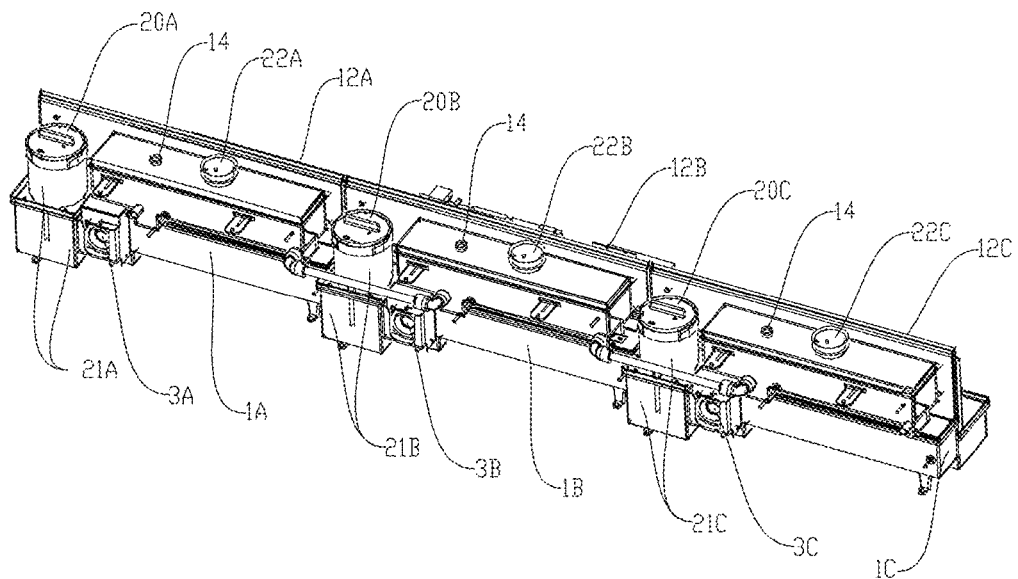
FIG. 13a shows an embodiment of the mist chambers (1A, 1B, 1C), mist chamber fans (3A, 3B, 3C), mist generator chambers (21A, 21B, 21C) and inclined outlets (12A, 12B, 12C) of the flames/smoke simulating system (two extension devices).
Figure 13B:
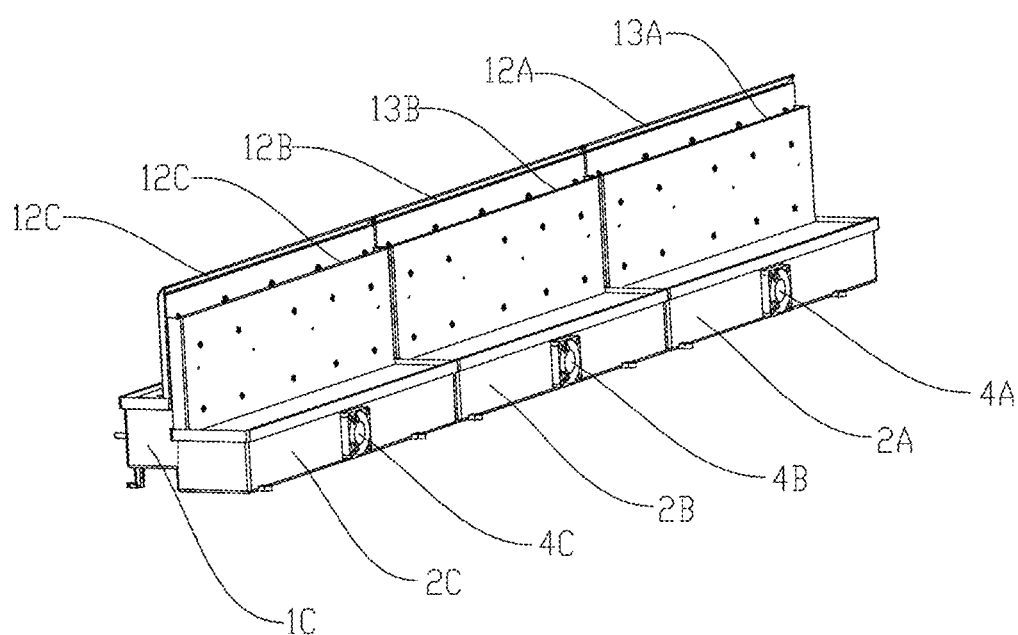
Figure 14:
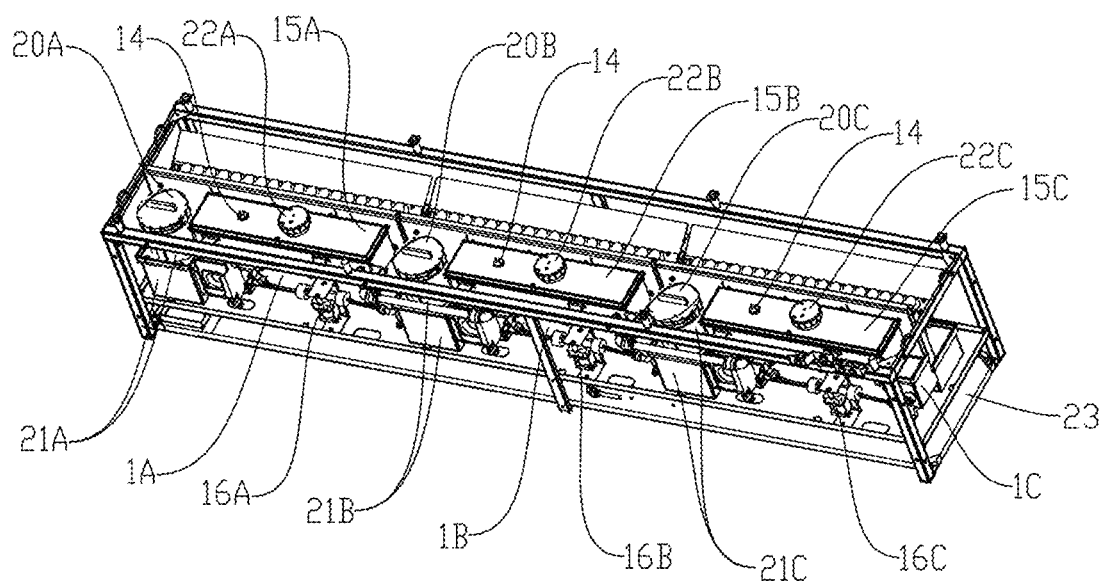
FIG. 14 shows the interior components of an embodiment of the flames/smoke simulating system (two extension devices), complete with fluid tanks (15A, 15B, 15C), mist generator chambers (21A, 21B, 21C), mist generator caps (20A, 20B, 20C) and solenoid (refilling) valves (16A, 16B, 16C).
Figure 15:
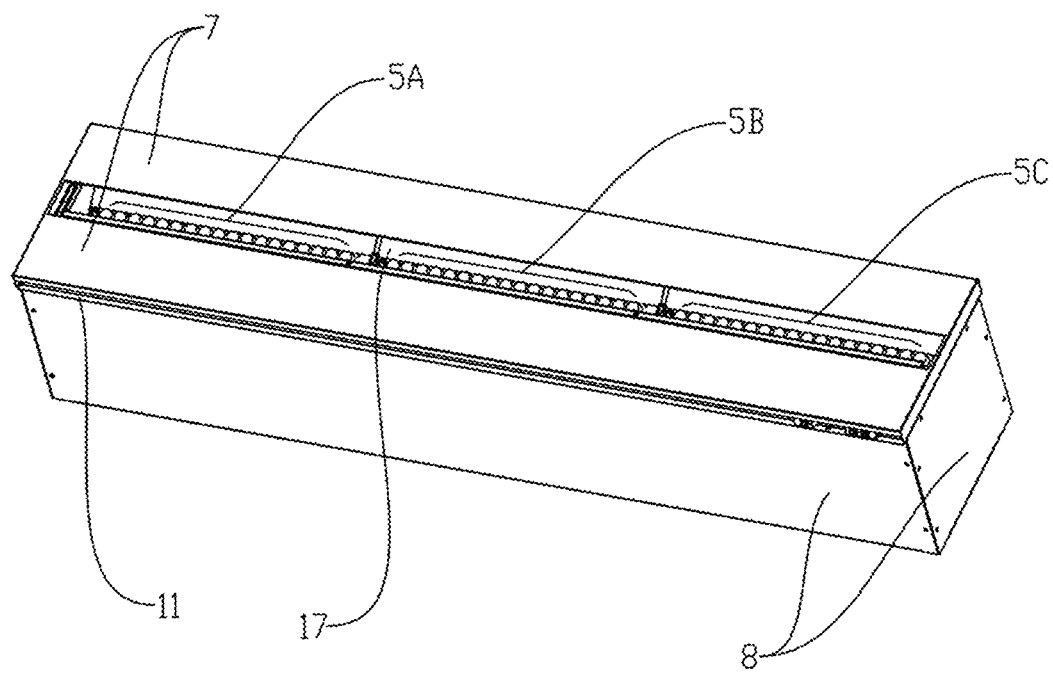
FIG. 15 shows an embodiment of the flames/smoke simulating system (two extension devices) with top cover (7) and side plates (8) installed.
Figure 16:
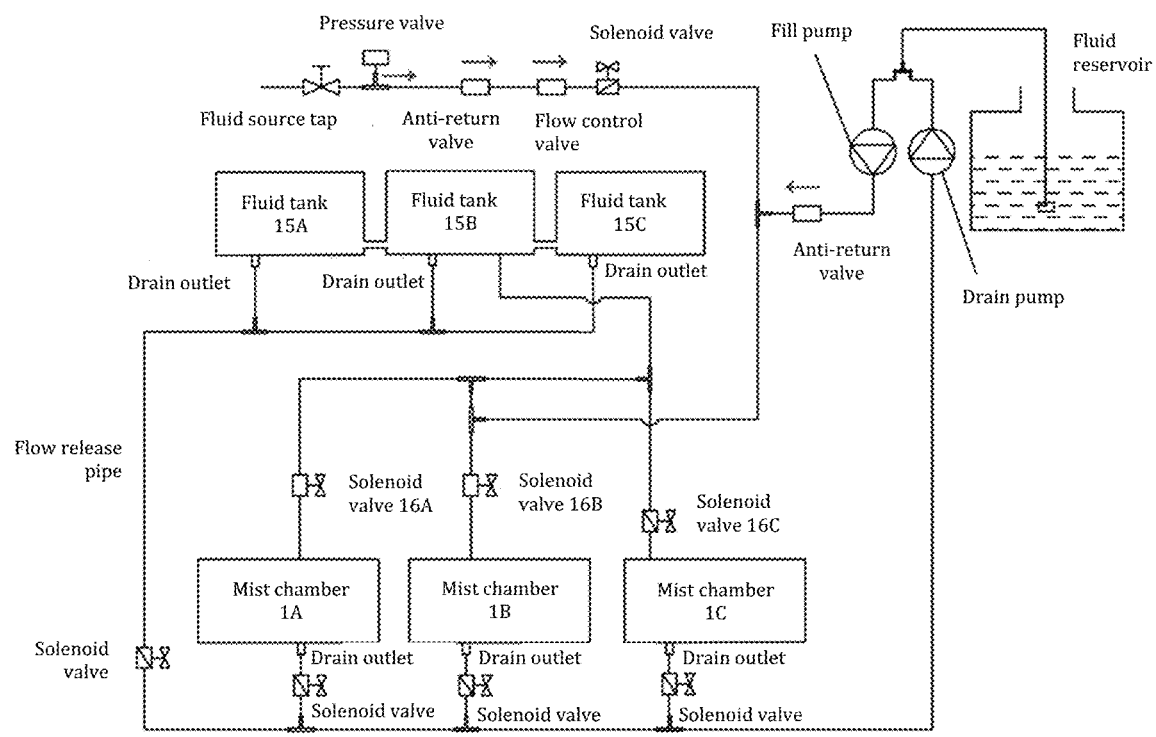
FIG. 16 shows a schematic flow diagram of the workings of an embodiment of the flame/smoke simulating system (two extension devices).

In another example, as shown in FIG. 13a, FIG. 13b and FIG. 14, when the flames/smoke simulating system consists of a flames/smoke simulating device and two extension devices, three fluid tanks (15A, 15B, 15C) are present, as also depicted in FIG. 16. The fluid channels (10A, 10B, 10C) and fluid tank (15B) of the flames/smoke simulating system are each installed with a fluid level sensor. A refill pipe is present from near the bottom of each of the fluid channels (10A, 10B, 10C) (within each of the corresponding mist chambers (1A, 1B, 1C)) and as connected to the fluid tanks (15A, 15B, 15C) may each be provided with a solenoid valve to control the fluid top up process within each mist chamber (1A, 1B, 1C); the fill pump, the fluid level sensors and as-mentioned solenoid valves for controlling the fluid top up process are connected and electronically communicable with the electronic board present in the flames/smoke simulating device as part of the flames/smoke simulating system.

Solenoid valves (shown in FIG. 16) control the fluid flow in the pipelines from the fluid tanks (15A, 15B, 15C) to the mist chambers (1A, 1B, 1C) through one of the fluid tanks (15B); the fluid level sensors in the fluid channels (10A, 10B, 10C) (i.e., within the mist chambers (1A, 1B, 1C)) work in tandem with the solenoid valves and the levels of fluid in the fluid channels (10A, 10B, 10C) to regulate these levels of fluid to a certain desired level that is suitably ideal for the ultrasound mist generators (as correspondingly positioned within the fluid channels (10A, 10B, 10C)) to operate effectively.

On the other hand, the fluid level sensor in the fluid tank (15B) is able to detect a low fluid level in the fluid tank (15A) and accordingly sends a signal to the electronic board to further enable one of the fluid sources (e.g. the fluid source tap or fluid reservoir) to be activated for the refilling of fluid to the fluid tanks (15A, 15B, 15C) to be carried out. It is not necessary to activate by hand the fill pump in the processes of refilling fluid, since a software application on a mobile terminal or a remote control may be used to do so. In addition, a smart programmable sequence may be implemented through the electronic board to automatically sense levels of fluid in the fluid channels (10A, 10B, 10C) and fluid tank (15B), control the refilling/release of fluid and enable the cleaning (e.g. flushing) of the fluid channels (10A, 10B, 10C) and/or the fluid tanks (15A, 15B, 15C) and other relevant components (e.g. pipelines) of the flames/smoke simulating system.

Figure 9A:
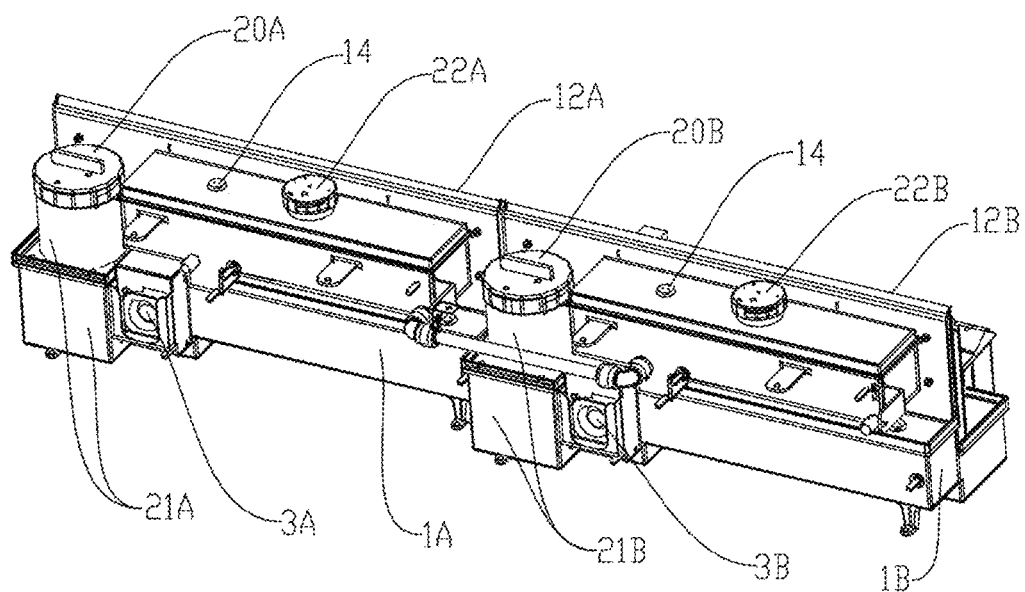
FIG. 9A shows an embodiment of the mist chambers (1A, 1B) and mist chamber fans (21A, 21B), inclined outlets (12A, 12B) and mist chamber caps (20A, 20B) of the flames/smoke simulating system (single extension device).
Figure 9B:
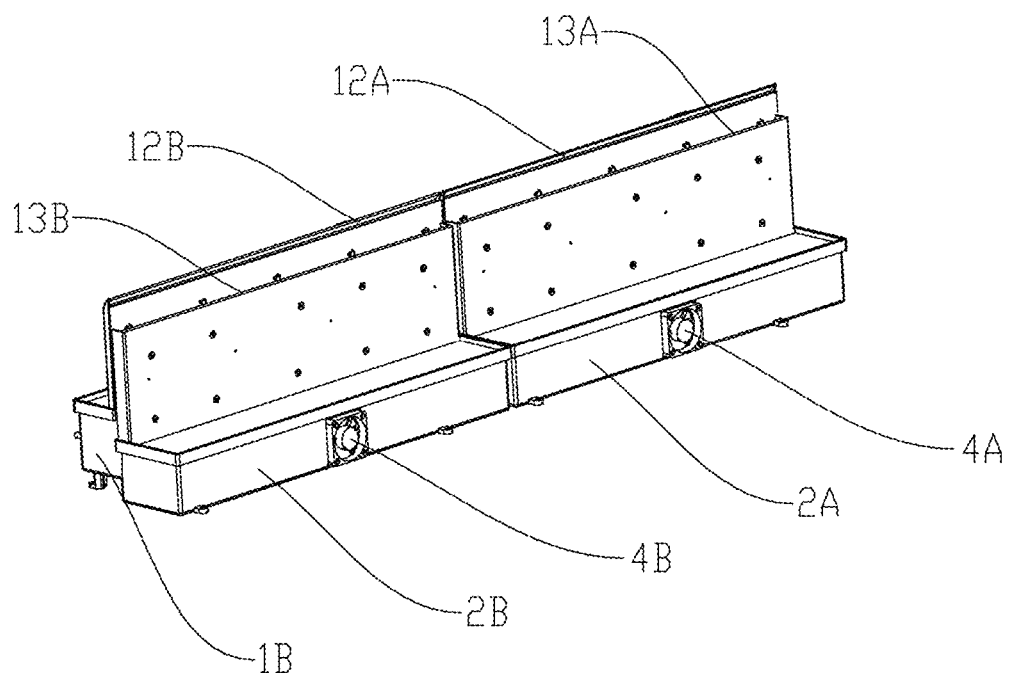
FIG. 9B shows the corresponding embodiment of the air chambers (2A, 2B) and air chamber fans (4A, 4B) of the flames/smoke simulating system as shown in FIG. 9A.

Example 21: Maintenance/Replacement of the Ultrasound Mist Generators(s) within the Flames/Smoke Simulating System In a flames/smoke simulating system having a flames/smoke simulating device and a single extension device, and as shown in FIG. 6 and FIG. 9a, each of the mist chambers (1A, 1B) correspondingly comprises a mist generator chamber (21A or 21B) and a linkage assembly (18); each linkage assembly (18) includes a baseplate (18b) and linkage member (18a). The ultrasound mist generator is installed upon the baseplate (18b); the linkage assembly (18) is reversibly detachable/installable from the corresponding mist generator chamber (21A, 21B) below the mist generator chamber cap (20A, 20B). A grove is present throughout the length of the linkage member (18a) to accommodate water-proofed electrical wiring and to allow it to be movable in a vertical sliding fashion within the mist generator chamber; the linkage member (18a) is attached to the baseplate (18b) rigidly at one end; a handle (18c) may be present at the other end. The handle may be positioned near the opening of the mist generator chamber. The mist generator cap (20A, 20B) may be used to rigidly suppress the handle of the linkage member; since the baseplate (18b) is in contact with the bottom of the mist generator chamber, this therefore enables the linkage assembly and the ultrasound mist generator also to be securely held in position. When any of the ultrasound mist generators is/are faulty or not operating normally, the mist generator chamber cap (20A, 20B) may be removed and the linkage member (18b) may be moved (via use of the handle) in an upward sliding fashion to remove the linkage assembly (18) and the relevant ultrasound mist generator; the removed ultrasound mist generator can thereafter be serviced or replaced, and the linkage assembly together with the serviced or a replaced ultrasound mist generator reinstalled into the relevant mist generator chamber.

In a flames/smoke simulating system having a flames/smoke simulating device and two single extension devices, the procedures to maintenance/replacement of the ultrasound mist generators(s) are similar to the procedures of maintaining/replacing the ultrasound mist generators mentioned earlier in the example.

Example 22: Dry Contact Switches of the Flames/Smoke Simulating System

Exemplarily, the flames/smoke simulating system includes a voltage supply; the voltage supply may consist of a dry contact and a 24V dc power supply socket. A fluid refill switch, a fluid release switch, a main power switch and other switches present may be configured as dry contacts to allow fluid refilling, fluid release and to turn the main power supply to the flames/smoke simulating system on or off.

Example 23: Filter Layers of Air Chamber and Mist Chamber Fans within the Flames/Smoke Simulating System Exemplarily, the inlets to the air chamber fans and mist chamber fans may each be fitted with a filter layer. The filter layer can be fabricated from carbon fibers or any suitable filter material (e.g. fabric or polymeric material) and can fulfill the purpose of preventing dust and dirt from directly entering the fans. In addition, each of the filter layers also serves to physically damp noise as generated by the rotational movements of the fans, thus allowing a quiet operation of the flames/smoke simulating system.

Example 24: Wireless Control of the Flames/Smoke Simulating System

Within the flames/smoke simulating system, the electronic board of the flames/smoke simulating device is equipped with a controller and a wireless communication module. The controller is able to communicate through the wireless module with a mobile terminal end or directly with a remote control device. The wireless communication module may be Wi-Fi technology, Bluetooth technology or cellular data. The controller can be used to synergistically control the various electrical and/or electronic components of the flame simulating system via the wireless module, or through the use of a remote control device.

Example 25: Uplift of Exiting Mist-Air Mix from Mist Chamber by Exiting Air from Air Chamber within the Flames/Smoke Simulating System Exemplarily, in a flames/smoke simulating system having a flames/smoke simulating device and a single extension device, as shown in FIG. 9a, the inclined outlets (12A, 12B) of the mist chambers (1A, 1B) may each be inclined at an angle, for example, between 30°-70° with reference to the horizon. The exiting mist-air mix (as generated within each of the mist chamber (1A, 1B)) requires to be lifted; the required lifting force is provided by the air that exits from each of the straight out outlets (13A, 13B) (FIG. 9b) of the air chambers (2A, 2B), thereby effecting a majorly vertical movement of each of the exiting mist-air mix. In an example, each of the inclined outlets is inclined at an angle of 45° (with reference to the horizon) and leans towards the side of each of its corresponding air chamber (2A, 2B); the exiting air-mist mix encounters the air from the straight out outlet (13A, 13B) and is lifted in an efficient manner to create a highly-realistic simulation of flames/smoke. The simulated flames/smoke may thereafter be illuminated by the corresponding light source (5A, 5B). The flames/smoke simulating system therefore creates a lengthened and pseudo-continuous row of simulated flames/smoke through the uplift and illumination of the individual exiting mist-air mix from the inclined outlets (12A, 12B).

In a flames/smoke simulating system having a flames/smoke simulating device and two single extension devices (FIG. 13b), the manner in which the exiting air-mist mix from its inclined outlets (12A, 12B, 12C) encounters the air from its straight out outlets (13A, 13B, 13C) and is lifted in an efficient manner to create a highly-realistic simulation of flames/smoke, is similar to the case mentioned earlier in this example. In this way, a lengthened and pseudo-continuous row of simulated flames/smoke through the uplift and illumination of the individual exiting mist-air mix from the inclined outlets (12A, 12B, 12C) is also achievable.

Example 26: Illumination of the Simulated Flames/Smoke of the Flames/Smoke Simulating System Exemplarily, in a flames/smoke simulating system having a flames/smoke simulating device and a single extension device, each of the light sources (5A, 5B) includes an orange colored light bank and an RGB (Red-Green-Blue) light bank. The orange light bank may consist of multiple lights positioned at a level below the flow outlet (17).

The RGB light bank may consist of multiple RGB lights, each having a selectable red, green or blue channel. The RGB lights are also positioned at a level below the flow outlet (17). In addition, the RGB light bank may be suitably installed at a selectable angle of inclination between 30°-70° (with reference to the horizon, and further in which the lights of the RGB light bank point towards the simulated flames/smoke), depending on the distance between the flow outlet (17) and the position of the relevant RGB light bank. The light rays from the lights of the light banks may be of a dispersed form (e.g. through the use of light diffusers) to allow the adequate illumination of the simulated flames/smoke to create highly realistic simulated flames/smoke.

Exemplarily, in a flames/smoke simulating system having a flames/smoke simulating device and two extension devices, each of the light sources (5A, 5B, 5C) includes an orange colored light bank and an RGB (Red-Green-Blue) light bank. The orange light bank may consist of multiple lights positioned at a level below the flow outlet (17). The RGB light bank may consist of multiple RGB lights, each having a selectable red, green or blue channel. The RGB lights are also positioned at a level below the flow outlet (17). In addition, the RGB light bank may be suitably installed at a selectable angle of inclination between 30°-70° (with reference to the horizon, and further in which the lights of the RGB light bank point towards the simulated flames/smoke), depending on the distance between the flow outlet (17) and the position of the relevant RGB light bank. The light rays from the lights of the light banks may be of a dispersed form (e.g. through the use of modifiers like light diffusers) to allow the adequate illumination of the simulated flames/smoke to create highly realistic simulated flames/smoke.

Example 27: Illumination of the Simulated Flames/Smoke Using Different Color(s) within the Flames/Smoke Simulating System Exemplarily, the colors which can be selected to illuminate the simulated flames/smoke of Example 26 above may be achieved by the mixing of the colors that may be formed and mixed by any combination of red, green, blue and/or orange. The colors of the simulated flames/smoke may be controlled and selected using a mobile end terminal or a remote control device. A relevant application software may be provided at the mobile end terminal or remote control device for this purpose. The application software may allow one to select a suitable red, green or blue channel by providing suitable selection buttons. Exemplarily, the mobile end terminal may be a mobile phone, a tablet device, or other suitable mobile devices; for instance on a mobile phone, the software application may provide a user interface which presents multiple red, green and blue simulated buttons for selection.

Example 28: Control of the Intensity of the Simulated Flames/Smoke within the Flames/Smoke Simulating System Exemplarily, a relevant application software may be provided at the mobile end terminal or remote control device to allow the control of the desired intensity of the simulated flames/smoke. The mobile end terminal may be a mobile phone, a tablet device, or other suitable mobile devices. The application software may be in the form of a user interface that presents the options to control the speeds of any of the mist chamber fans and/or air chamber fans, together with the possibility of controlling the rate at which mist is generated by any of the ultrasound mist generators; the overall desired intensity of the simulated flames/smoke may then be communicated to and effected by the controller on the electronic board within the system.

Example 29: Control of the Colors and Intensity of the Simulated Flames/Smoke within the Flames/Smoke Simulating System Exemplarily, both the color and the intensity of the simulated flames/smoke may be controlled. A relevant application software may be provided at the mobile end terminal or remote control device to allow the control of the desired color(s) and intensity of the simulated flames/smoke. The mobile end terminal may be a mobile phone, a tablet device, or other suitable mobile devices.

Example 30: Humidification/Aromatherapy Capability of the Flames/Smoke Simulating System Exemplarily, the mist-air mix as generated by an operating flames/smoke simulating system creates an environment with increased relative humidity; this may be desirable to maintain a comfortable level of humidity suitable for dry climates. Further exemplarily, an air freshener or fragrance essence may be added to any of the fluid channels of the flames/smoke simulating system to consequently create a pleasant aroma around the surroundings external to the device.

Applications

The potential applications of the presently disclosed technology are wide-ranging and are described below:

The flames/smoke simulating device or system provides a safe, convenient and clean means to simulate flames/smoke in a highly realistic manner, for instance, in an indoor environment with strict building fire safety codes. The use of such a flames/smoke simulating device or system does not require special considerations in regard of fire safety issues in the indoor environment.

The flames/smoke simulating device or system may also be used for humidifying an indoor environment when dry climates are experienced (for instance, in wintry conditions). Creating a higher level of relative humidity may ensure comfort for certain groups of persons who may be sensitive to the drying out of the mucous membranes.

The flames/smoke simulating device or system may also be used to allow an infusion of scents into its surroundings. Such scents may create a relaxing environment for one to be relieved of stress.

It will be apparent that various other modifications and adaptations of the invention will be apparent to the person skilled in the art after reading the foregoing disclosure without departing from the spirit and scope of the invention and it is intended that all such modifications and adaptations come within the scope of the appended claims.

The invention claimed is:
1. A flames/smoke simulating device, comprising:
an outer covering;
an ultrasound mist generator;
a mist chamber and a mist chamber fan;
an air chamber and an air chamber fan;
a light source; and
an electronic board,
wherein the outer covering comprises a flow outlet and a flow inlet; said ultrasound mist generator is positioned within the mist chamber; said mist chamber fan is positioned on the mist chamber; said mist chamber contains an inclined outlet; said air chamber fan is positioned on the air chamber; said air chamber contains a straight out outlet; said flow inlet, mist chamber and inclined outlet are hydraulically linked; said flow inlet, air chamber and straight out outlet are hydraulically linked; said inclined outlet and straight out outlet concur within the flow outlet; the portion above the flow outlet may be illuminated by the light source; said electronic board is electronically connected to the ultrasound mist generator, mist chamber fan, air chamber fan and light source.

2. The flames/smoke simulating device of claim 1, wherein the flow inlet is positioned at the meeting or overlap of the top cover and side plate of the outer covering; and
wherein the flow outlet is positioned on the top cover.

3. The flames/smoke simulating device of claim 1, further comprising a fluid tank and at least a fluid pump.

4. The flames/smoke simulating device of claim 3, wherein the ultrasound mist generator is positioned within the fluid channel of the mist chamber;
wherein the bottom position of the fluid channel comprises a fluid flow opening; said fluid channel and fluid tank are linked by a pipe; and
wherein the fluid tank is separately linked to the at least one fluid pump and/or a fluid source.

5. The flames/smoke simulating device of claim 4, wherein the fluid channel and fluid tank each contains a fluid level sensor;
wherein said pipe is installed with a refill valve; and
wherein said at least one fluid pump, fluid level sensors and refill valve are electronically connected to the electronic board.

6. The flames/smoke simulating device of claim 1, wherein the mist chamber comprises a mist generating chamber and linkage assembly,
wherein the linkage assembly comprises a baseplate and linkage member,
wherein the ultrasound mist generator is positioned. on the baseplate, and
wherein the linkage assembly is detachably installed within the mist chamber.

7. The flames/smoke simulating device of claim 4, wherein the electronic board contains a controller and wireless module, and
wherein the controller may either be connected to a. mobile end terminal via the wireless module, or connected directly with a remote control device.

8. The flames/smoke simulating device of claim 1, wherein the inclined outlet is inclined at an angle between 30°-70° with reference to the horizon.

9. A method of simulating flames/smoke using the flames/smoke simulating device as defined in claim 4, comprising the following steps:
(a) filling the fluid channel with fluid;
(b) allowing a portion of the air that enters the flow inlet of the flames/smoke simulating device to push mist out of the mist chamber through the inclined outlet;
(c) allowing the remaining portion of the air entering the flow inlet to exit from the straight out outlet;

(d) allowing the mist-air exiting the inclined outlet to mix with the exiting air from the straight out outlet to form a resulting lifted mixture, and
(e) illuminating the resulting lifted mixture using the light source to form simulated flames/smoke.

10. A method of simulating flames/smoke using the flames/smoke simulating device as defined in claim 7, comprising the following steps:
(a) filling the fluid channel with fluid;
(h) allowing a portion of the air that enters the flow inlet of the flames/smoke simulating device to push mist out of the mist chamber through the inclined outlet;
(c) allowing the remaining portion of the air entering the flow inlet to exit from the straight out outlet;
(d) allowing the mist-air exiting the inclined outlet to mix with the exiting air from the straight out outlet to form a resulting lifted mixture;
(e) illuminating the resulting lifted mixture using the light source to form simulated flames/smoke, and
(f) selectively controlling the strength and/or color of the formed simulated flames/smoke wirelessly via a mobile end terminal or a remote control device.

11. A flames/smoke simulating system, comprising of a flames/smoke simulating device and at least one extension module, wherein:
the flames/smoke simulating device comprises an outer covering, an ultrasound mist generator, a mist chamber and a mist chamber fan, an air chamber and an air chamber fan, a light source, and an electronic board;
wherein the outer covering comprises a flow outlet and a flow inlet; said ultrasound mist generator is positioned within the mist chamber; said mist chamber fan is positioned on the mist chamber;
wherein the mist chamber contains an inclined outlet; said air chamber fan is positioned on the air chamber;
wherein the air chamber contains a straight out outlet; said flow inlet, mist chamber and inclined outlet are hydraulically linked; said flow inlet, air chamber and straight out outlet are hydraulically linked; said inclined outlet and straight out outlet concur within the flow outlet; the portion above the flow outlet can be illuminated by the light source; said electronic board is electronically connected to the ultrasound mist generator, mist chamber fan, air chamber fan and light source, and extension module; the extension module comprises one or more extension devices,
wherein each extension device comprises an ultrasound mist generator, a mist chamber and a mist chamber fan, an air chamber and an air chamber fan, and a light source, said ultrasound mist generator is positioned within the mist chamber said mist chamber fan is positioned on said mist chamber;
wherein the mist chamber contains an inclined outlet; said air chamber fan is positioned on the air chamber; and
wherein the mist chamber contains a straight out outlet; said flow inlet, said mist chamber and said inclined outlet are hydraulically linked; said flow inlet, said air chamber and said straight out outlet are hydraulically linked; said inclined outlet and said straight out outlet concur within said flow outlet; the portion above said flow outlet can be illuminated by said light source.

12. The flames/smoke simulating system of claim 11, wherein the flow inlet is positioned at the meeting or overlap of the top cover and a side plate of the outer covering; and wherein the flow outlet is also positioned on the top cover.

13. The flames/smoke simulating system of claim 11, wherein the flames/smoke simulating device and the one or more extension devices each further comprises a fluid tank, and
wherein the fluid tank of the flames/smoke simulating device is hydraulically linked to both at least one fluid pump, and the fluid tank or tanks of the one or more extension devices.

14. The flames/smoke simulating system of claim 13, wherein each of the ultrasound mist generators of the flames/smoke simulating device and the one or more extension devices is positioned within each of the fluid channels of the corresponding mist chamber or chambers in the flames/smoke simulating device and the one or more extension devices;
wherein the bottom position of each of the fluid channels comprises a fluid outlet; each of the said fluid channels and each corresponding fluid tank are linked by pipelines; and
wherein the fluid tank of the flames/smoke simulating device and a fluid source are each linked.

15. The flames/smoke simulating system of claim 14, wherein each of the fluid channels and at least one of the fluid tanks each contains a fluid level sensor;
wherein the said pipelines are installed with at least one solenoid valve; and
wherein the at least one fluid pump, fluid level sensors and at least one solenoid valve are connected to the electronic board.

16. The flames/smoke simulating system of claim 11, wherein each of the mist chambers comprises a mist generating chamber and linkage assembly,
wherein the linkage assembly each comprises a baseplate and linkage member,
wherein each of the ultrasound mist generators is correspondingly positioned on each of the corresponding baseplates, and
wherein each of the linkage assemblies is detachably installed within the corresponding mist generating chambers.

17. The flames/smoke simulating system of claim 11, wherein the electronic board contains a controller and wireless module, and
wherein the controller may either be connected to a mobile end terminal via the wireless module, or connected directly with a remote control device.

18. The flames/smoke simulating system of claim 11, wherein each of the inclined outlets is inclined at an angle between 30°-70° with reference to the horizon.

19. A method of simulating flames/smoke using the flames/smoke simulating system as defined in claim 14, comprising the following steps:
(a) filling the fluid channels with fluid;
(b) allowing a portion of the air that enters the flow inlet of the flames/smoke simulating system to push mist out of the mist chambers through the inclined outlets;
(c) allowing the remaining portion of the air entering the flow inlet to exit from the straight out outlets;
(d) allowing mist-air exiting the inclined outlets to correspondingly mix with exiting air from the straight out outlets to form a resulting lifted mixture, and
(e) illuminating the resulting lifted mixture using the light sources to form simulated flames/smoke.

20. A method of simulating flames/smoke using the flames/smoke simulating system of claim 17, comprising the following steps:
(a) filling the fluid channels with fluid;

(b) allowing a portion of the air that enters the flow inlet of the flames/smoke simulating system to push mist out of the mist chambers through the inclined outlets;
(c) allowing the remaining portion of the air entering the flow inlet to exit from the straight out outlets;
(d) allowing mist-air exiting the inclined outlets to correspondingly mix with exiting air from the straight out outlets to form a resulting lifted mixture;
(e) illuminating the resulting lifted mixture using the light sources to form simulated flames/smoke, and
(f) selectively controlling the strength and/or color of the formed simulated flames/smoke wirelessly via a mobile end terminal or a remote control device.

\* \* \* \* \*